US012722329B2

(12) United States Patent
Romanov

(10) Patent No.: US 12,722,329 B2
(45) **Date of Patent: *Sep. 1, 2026**

(54) TOOL, TOOL SYSTEM AND METHOD FOR THE PRODUCTION OF PARTICLE FOAM PARTS

(71) Applicant: Kurtz GmbH & Co. KG, Kreuzwertheim (DE)

(72) Inventor: Victor Romanov, Wertheim (DE)

(73) Assignee: Kurtz GmbH & Co. KG, Kreuzwertheim (DE)

( * ) Notice: Subject to any disclaimer, the term of this patent is extended or adjusted under 35 U.S.C. 154(b) by 176 days.

This patent is subject to a terminal disclaimer.

(21) Appl. No.: 18/521,157

(22) Filed: Nov. 28, 2023

(65) Prior Publication Data

US 2024/0091990 A1 Mar. 21, 2024

Related U.S. Application Data

(63) Continuation of application No. 17/768,506, filed as application No. PCT/EP2020/077858 on Oct. 5, 2020, now Pat. No. 11,865,741.

(30) Foreign Application Priority Data

Oct. 15, 2019 (DE) ..................... 10 2019 127 680.2

(51) Int. Cl.
*B29C 35/08* (2006.01)
*B29C 44/44* (2006.01)

(52) U.S. Cl.
CPC ........ *B29C 35/0805* (2013.01); *B29C 44/445* (2013.01); *B29C 2035/0855* (2013.01); *B29C 2035/0861* (2013.01)

(58) Field of Classification Search
CPC .............. B29C 35/0805; B29C 44/445; B29C 44/1219; B29C 44/3496; B29C 49/42811; B29C 65/022; B29C 65/7473
See application file for complete search history.

(56) References Cited

U.S. PATENT DOCUMENTS 3,079,723 A 3/1963 Roes
3,242,238 A 3/1966 Edberg et al.
(Continued)

FOREIGN PATENT DOCUMENTS

CN 108602218 A 9/2018
DE 102016100690 7/2017
(Continued)

OTHER PUBLICATIONS

Notice of First Examination Opinion issued in the CN Patent Applicatio No. 202080080331.4, mailed on Sep. 27, 2023. 5 pages.
(Continued)

*Primary Examiner* — Stella K Yi
(74) *Attorney, Agent, or Firm* — HoustonHogle LLP

(57) ABSTRACT

A tool for the production of particle foam parts through the welding of foam particles by means of electromagnetic waves comprises two mould halves which bound a mould cavity. At least one of the two mould halves is made of a material which is transparent to electromagnetic waves and has a boundary wall which bounds the mould cavity and one or more supports serving to support the boundary wall on a capacitor plate on the side facing away from the mould cavity and forming one or more hollow spaces. A tool system for the production of particle foam parts has the tool and at least one trimming body, which is designed for introduction into the hollow space or at least one of the hollow spaces. A method for the production of a particle foam part with the tool or tool system is also specified.

15 Claims, 22 Drawing Sheets

(56) References Cited

U.S. PATENT DOCUMENTS

Figure 1:
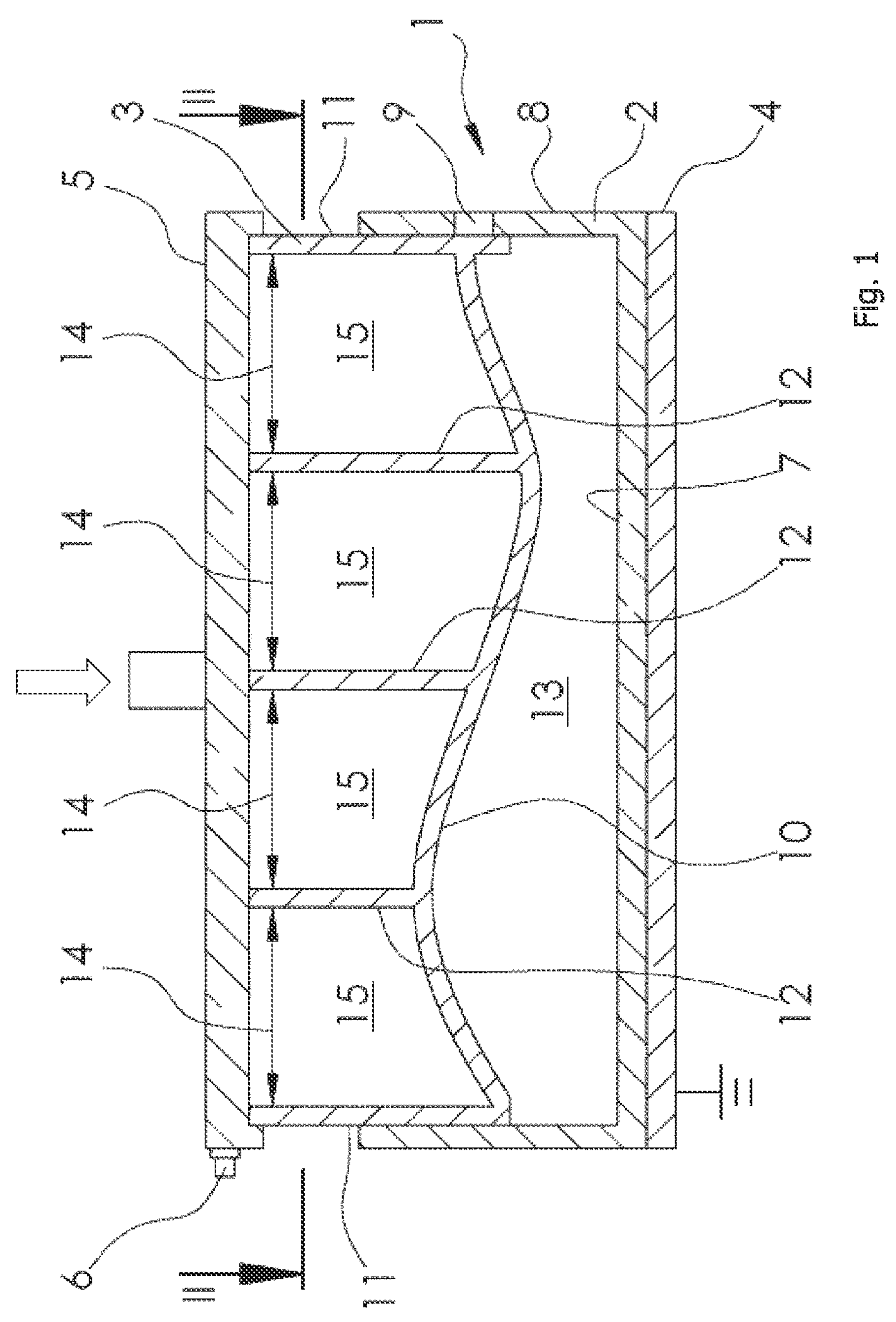

| | | | |
|---|---|---|---|
| 9,656,263 | B2 | 5/2017 | Laurell et al. |
| 11,584,051 | B2 | 2/2023 | Romanov |
| 2004/0247725 | A1 | 12/2004 | Lang et al. |
| 2014/0243442 | A1 | 8/2014 | Coles et al. |
| 2020/0316829 | A1 | 10/2020 | Reuber et al. |
| 2021/0206036 | A1 | 7/2021 | Romanov et al. |

FOREIGN PATENT DOCUMENTS

| | | | |
|---|---|---|---|
| DE | 102016123214 | A1 | 6/2018 |
| DE | 102017128895 | A1 | 6/2019 |
| DE | 202018102138 | U1 | 7/2019 |
| GB | 1403326 | | 8/1975 |
| WO | WO 01/064414 | A1 | 9/2001 |
| WO | WO 2013/050581 | A1 | 4/2013 |
| WO | WO 2017/127310 | A1 | 7/2017 |
| WO | WO 2017/127312 | A1 | 7/2017 |
| WO | WO 2018/095572 | | 5/2018 |
| WO | WO 2018/099833 | | 6/2018 |
| WO | WO 2018/100713 | A1 | 6/2018 |

OTHER PUBLICATIONS

Benkert, H. Einfuerhung in die Technische Keramik [ Introduction to Technical Ceramics], seramy.

International Search Report of the International Searching Authority, mailed on Jan. 15, 2021, from International Application No. PCT/EP2020/077858, filed on Oct. 5, 2020. 5 pages.

Written Opinion mailed on Jan. 15, 2021, from International Application No. PCT/EP2020/077858, filed on Oct. 5, 2020. 6 pages.

Search Report mailed on Jun. 4, 2020, from German Patent Application No. 10 2019 127 680.2, filed on Oct. 15, 2019. 8 pages.

International Preliminary Report on Patentability mailed on Apr. 19, 2022, from International Application No. PCT/EP2020/077858, filed on Oct. 5, 2020. 13 pages.

3
15
12
11

3
15
11

3
11
12
15

3
12
15
11

1
2
3
4
5
30
30
30
30
15
15
15
15
13
10
IV 134
133
3
130
130
130
130
15
15
15
15
138
136
131
135
12
132
131
137
11

TOOL, TOOL SYSTEM AND METHOD FOR THE PRODUCTION OF PARTICLE FOAM PARTS

RELATED APPLICATIONS

This application is a Continuation of the U.S. application Ser. No. 17/768,506, filed Apr. 13, 2022, which is a § 371 National Phase Application of International Application No. PCT/EP2020/077858, filed on Oct. 5, 2020, now International Publication No. WO 2021/073924 A1, published on Apr. 22, 2021, which International Application claims priority to German Application 10 2019 127 680.2, filed on Oct. 15, 2019, all of which are incorporated herein by reference in their entirety.

The present invention relates to a tool, a tool system and a method for the production of particle foam parts.

The tool and the tool system for the production of particle foam parts make use of electromagnetic waves, wherein foam particles are welded into a particle foam part by means of the electromagnetic waves. The energy required for welding is applied to the foam particles by means of the electromagnetic waves.

For a long time now, attempts have been made to weld foam particles into particle foam parts by means of electromagnetic waves. Relevant methods are disclosed for example by U.S. Pat. Nos. 3,079,723, 3,242,238 and GB 1,403,326.

Described in U.S. Pat. No. 3,079,723 is a method for the sintering of moist thermoplastic foam particles. The particles are heated dielectrically and simultaneously compacted in the mould. Electromagnetic waves with a frequency of around 2 to 1000 MHz are applied.

A similar method is disclosed by U.S. Pat. No. 3,242,238, in which foam particles are wetted with an aqueous solution and subjected to an electromagnetic field with a frequency of around 5 to 100 MHz.

Described in GB 1,403,326 is a method for the welding of expandable polystyrene foam particles, in which the particles are wetted with an aqueous solution and subjected to an electromagnetic field of 5 to 2000 MHz.

Considerable efforts have also been made in recent decades to weld foam particles using electromagnetic waves. Relevant methods are described in WO 01/064414 A1 and WO 2013/050581 A1.

WO 01/064414 A1 discloses a method in which polymer particles of polyolefins, which are wetted by a liquid medium, are heated by electromagnetic waves, in particular microwaves. Here the temperature in the mould is regulated by control of its internal pressure.

Described in WO 2013/050581 A1 is a method for the production of particle foam parts in which a mixture of foam particles and dielectric transfer fluid is heated by means of electromagnetic waves, in order to fuse the foam particles into a particle foam part. Radio waves or microwaves are used as electromagnetic waves. The material of the foam particles is made of polypropylene (PP).

Despite these long, sustained and considerable efforts, there are no machines on the market for the welding of foam particles using electromagnetic waves. Only machines for welding foam particles using steam are in commercial use.

There are no machines for the welding of foam particles at the series production stage, even though the associated benefits have long been known. These are in particular:

- more efficient energy input
- after welding, the foam particles are dry, and may immediately be used in further processing
- heating is from the inside to the outside, so that the inner zone of the foam particles may be significantly better welded, and
- equipment for the generation of steam, which is much more expensive than a generator of electromagnetic waves, may be dispensed with.

The applicant for the present patent application has developed apparatus for the welding of foam particles using electromagnetic waves, and the corresponding method, to the point where it is in a position to produce fairly large quantities of foam particles by means of prototypes close to series production standard, through welding of foam particles by means of electromagnetic waves. These apparatus variants and methods are based on the technology described in WO 2017/127310 A1, WO 2017/127312 A1 and WO 2018/100713 A2, to which reference is made to the full extent in terms of their disclosed content, also in connection with the invention described below and in particular, additionally but not exclusively, relating to the apparatus variants and methods plus materials.

Herewith there has been success in obtaining uniform welding in particle foam parts using different moulds. The more complex the mould of the particle foam part, the more difficult it is to achieve uniform welding of the foam particles. For decades it has been known that such foam particles in a plastic cup with some water may be placed in a conventional domestic microwave oven, and a good even welding may be achieved. If however the particle foam parts to be produced are larger or more complex in form or strongly contoured or of irregular thickness (measured in a direction perpendicular to the capacitor plates, i.e. in the direction of propagation of the electromagnetic field), then it is difficult to obtain a uniform distribution of the electromagnetic field in all places. The problems have a wide variety of causes. On the one hand, electromagnetic waves do not in principle have the same energy density throughout. The shorter the wavelength, the greater the local fluctuations. On the other hand, electromagnetic waves are influenced by the material of the tool bounding the mould cavity. Here there are various effects. On the one hand, some of the energy of the electromagnetic waves may be absorbed by the material of the moulding tool. On the other hand, this material functions as a dielectric which is polarised in such a way that an electromagnetic field opposite to the electromagnetic waves is generated. Through this, the energy density of the electromagnetic waves is shifted and may be concentrated locally in the mould cavity. The inventor of the present invention has taken this into account for the first time in development of the present invention.

Furthermore, the material of which the foam particles are made may have an effect on the electromagnetic field, so that, with use of different materials, the same tool acts in a different way.

In the RF foaming of complex geometries it is therefore desirable for the electrical field to be as constant or uniform as possible in all areas of the moulding. There are suggestions for achieving this for example by deformation of electrodes and variation of tool wall thickness. However, this is linked to the application of very complex simulation programs. The problem here is that the relative permittivity of tool material and particle foam vary greatly, for example by a factor of 2 to 5.

A further problem lies in the fact that it is practically impossible to optimise the tools for RF foaming retrospectively, if for example the electrical field needs to be strengthened in some areas.

Since heating with an RF field proceeds from the inside to the outside, welding of outer particle layers is poorer than in the core, and the surface may remain rough. In order to improve this, heating and cooling channels have formerly been provided in the tool.

For technical process reasons it may be sensible for the foam particles to be fed into the mould cavity mixed with water as heat transfer medium. During welding, the water may then be pressed out of the mould cavity. By this means, the average relative permittivity in the mould cavity may vary and with it also the local electrical field strength. Control of such a process is difficult.

In an apparatus for the production of particle foam parts, the aim is to produce different particle foam parts. For this purpose one must change over the relevant tools which define a mould cavity in which the particle foam parts are moulded. This is already well-known from conventional apparatus for the production of particle foam parts, in which the foam particles are welded using steam. The inventors of the present invention have however recognised that, other than in the welding of foam particles by means of steam, in welding by means of electromagnetic waves the function of a tool depends on the shape, which is preset by the shape of the particle foam part to be produced. This is one of the main reasons why, despite the most intensive experiments and development efforts over decades, there has been no success in developing apparatus suitable for series production for the welding of particle foam parts by means of electromagnetic waves, in particular parts with an irregular shape or thickness or strong contouring.

The invention is therefore based on the problem of creating a tool for the production of particle foam parts, together with a corresponding tool system, by which foam particles may be welded by means of electromagnetic waves, reliably and with high quality, in a simple manner.

A problem of the present invention is in particular to specify a tool, a tool system and a method which avoid the above-mentioned disadvantages and problems, or at least improve them.

A further problem of the present invention is to provide scope for retrospective optimisation of such a tool.

A further problem of the present invention is to improve a tool, a tool system and a method in respect of uniform quality of welding in the cross-section of the particle foam part.

A further problem of the present invention is to provide scope for balancing out any change in relative permittivity in the mould cavity during the foaming process, and/or to influence during the foaming process the electromagnetic field prevailing in the mould cavity, in particular in respect of electrical field strength.

One or more of the stated problems is or are solved by the subjects of the independent patent claims. Advantageous developments are set out in the respective dependent claims.

The tool according to the invention for the production of particle foam parts through the welding of foam particles by means of electromagnetic waves includes two mould halves which bound a mould cavity. At least one of the two mould halves is made of a material which is transparent to electromagnetic waves and has a boundary wall which bounds the mould cavity and one or more supports serving to support the boundary wall on a capacitor plate on the side facing away from the mould cavity and forming one or more hollow spaces of the mould half.

Due to the forming of hollow spaces on the side of the boundary wall facing away from the mould cavity, mould halves of any desired shape may be realised with a minimum of material. The influencing of the electromagnetic field in the mould cavity by the material of the mould half may therefore be limited. Surprisingly, simulations such as tests have revealed that the supports cause hardly any discontinuity or lack of homogeneity of field strength in the mould cavity. Instead, the field strength between areas corresponding to the supports and areas corresponding to the hollow spaces averages out and this averaging out or evenness continues into the mould cavity. In other words, there is an averaging of the permittivity levels of the material of the mould halves and the air contained in the hollow spaces which is surprisingly homogenous, even if the material of the mould halves s not distributed homogenously in the hollow spaces located therein. The mould halves are therefore preferably so designed that they have an average permittivity corresponding roughly to the permittivity of the foam particles to be welded. This gives rise to a very homogenous electrical field, even if the mould cavity has a complex contour.

It is therefore possible in a simple manner to produce mould halves with similar dielectric properties to the object to be produced. In particular, harmonisation of the dielectric properties of the mould half to the particle foam part is possible in a surprisingly simple manner. When the dielectric properties of the mould half correspond roughly to those of the particle foam part, this also has the advantage that the electromagnetic field in the whole area between the capacitor plates is roughly homogenous, irrespective of the shape of the mould half or of the particle foam part.

Support of the capacitor plate by the supports may be effected directly or indirectly (i.e. with an intermediate layer). The supports may be realised by side walls and/or intermediate walls. The boundary wall and the supports may be made in one piece, in particular being monolithic. In the case of some moulds, a capacitor plate already forms a boundary of the mould cavity. Naturally it is also possible for each of the two mould halves to be made of material which is transparent to electromagnetic waves, and to have the boundary wall and the support(s).

Preferably the boundary wall of at least one mould half is made with substantially constant thickness.

The supports of at least one mould half run preferably parallel to a press direction, by which the mould halves are pressed together by a press during operation.

The mould halves may have connections for a tempering medium, which is able to flow through the one or several hollow space(s).

At least one of the two mould halves may be designed for trimming the mould half by means of the one or more support(s) and/or the one or several hollow space(s), in order to influence an electromagnetic field in the mould cavity. It is thus possible to trim or adjust such a tool retrospectively, i.e. after its manufacture. By this means the tool may be adjusted individually. The tool may therefore on the one hand be matched to the electrical field provided by an apparatus for the production of particle foam parts. On the other hand, the distribution of the electrical field within the mould cavity may be adjusted individually, i.e. in certain areas the electrical field is intensified as compared with other areas if, adjacent to these areas, a trimming body is inserted in the hollow space of the mould half. By this means the electrical field in the tool may be matched to the geometry of the mould cavity.

Furthermore, the electrical field may be matched to the material from which the foam particles are made, which are to be welded into a particle foam part. Different materials from which the foam particles are made have differing effects on an applied electrical field. Thus it may be that the tool in a certain setting functions very well with a first material, but not with a second material. By replacing or modifying the arrangement of trimming bodies in the tool, the latter may be adapted to the second material.

To summarise it may be stated that the electrical field applied in the mould cavity is influenced by

- the device which generates the electromagnetic field, as for example the signal generator and the capacitor plates for an RF field
- the shape and material of the mould halves of the moulding tool, also the material to be welded.

In principle there is the possibility of simulating the electrical field in a mould cavity. If however the tool is used in another apparatus to produce a particle foam part, or a different material is to be welded to produce it, then in certain circumstances the simulation is no longer suitable. The tool according to the invention may be trimmed or adjusted retrospectively and it may also be adapted subsequently to suitably changed circumstances (e.g. a different apparatus for production of a particle foam part or different material to be welded).

For trimming it is for example possible to introduce a dielectric material into the mould half. This dielectric material is polarised by applying an electrical field so that, in the dielectric material, an electrical field counteracting the electrical field is generated. By this means, the electrical field in the area of the mould cavity is concentrated and intensified, leading to an enhanced welding effect for welding the foam particles into a particle foam part.

Preferably the mould half or mould halves has or have at least one opening leading into the hollow space, so that a trimming body may be inserted in the hollow space. The wall bounding the mould cavity is of course made without an opening. The opening may preferably face the side facing away from the mould cavity, but may also preferably face to the side.

The hollow space or at least one of the several hollow spaces may have a shaped or latching element for positioning and/or fixing of a trimming body in the hollow space.

Alternatively or additionally, the mould half may have a connection for a trimming fluid which is connected to at least one of the one or more hollow spaces. With this, a trimming fluid may be fed through the hollow space or spaces or into the hollow space or out of the hollow space. Preferably the hollow spaces are connected to one another for fluidic communication, so that the hollow spaces may be fed jointly via a single or a few, in particular two, connection for trimming fluid. On the other hand, at least partial volumes of several hollow spaces may be separated, fluid-tight, from one another, so that the hollow spaces or partial volumes thereof may be fed individually with trimming fluid. A partial volume may for example be bounded by a cover located in the hollow space. The cover may be mounted with variable height within the hollow space and may be biased and/or height-adjustable in one direction.

In addition, at least one connection may be provided for compressed air and/or vacuum, being connected to at least one of the one or more hollow spaces. With this, the hollow space or spaces may be supplied with compressed air or vacuum, in order for example to press out the trimming fluid from the hollow space or spaces or to suck it into the hollow space or spaces. Preferably the connection or connections for compressed air and/or vacuum is or are arranged at a higher level than the connection or connections for trimming fluid, so that the trimming fluid can collect in the lower part of the hollow spaces and the compressed air or vacuum connection remains free. Preferably the hollow spaces are connected through connection openings in the supports, with the connection openings or a group of connection openings being flush with at least one of the connections for tempering medium, trimming fluid, compressed air or vacuum. The connections for tempering medium, trimming fluid, compressed air or vacuum may be made in a side wall which closes the mould half at the side and acts as support. The connection openings may be made in bars which run between side walls and act as supports.

A further aspect of the present invention relates to a tool system for the production of particle foam parts, which includes the tool described above and at least one trimming body, which is designed for insertion in the hollow space or at least one of the hollow spaces, and/or has a trimming fluid provision unit which is designed to supply the mould half or halves with a trimming fluid.

The trimming body is preferably made from a material with a relative permittivity (εr) of at least 2. The greater the relative permittivity of the material of the trimming body, the greater its effect as trimming body. Materials with a relative permittivity of at least 3 or at least 4 may therefore also be expedient. The smaller the relative permittivity of the material of the trimming body, the more precisely and finely the electrical fields in the mould cavity may be set. Materials with a low permittivity, for example less than 2, may therefore also be useful.

The trimming body may be in the form of a plug-in body, which may be fixed in the mould half by means of a latching element or by frictional locking. The trimming body may thus be replaced easily in the mould half, so that the mould half can be adapted to different production conditions.

The trimming body may be so designed that it fills only a part of the hollow space or spaces. In particular the trimming body is so arranged in the respective hollow space that it is preferably remote from the mould cavity. By this means, the hollow space adjacent to the mould cavity is, as before, free and may be used for the through passage of a tempering medium.

The trimming body may be made of a solid body. In particular the trimming body may be made of a plastic body. The trimming body may however be made by filling one or more of the hollow spaces with a setting material.

The tool system may also have several trimming bodies, of varying size and/or of different materials, having different relative permittivity.

The tool system may also have a connection plate, for mounting between a capacitor plate and a mould half of the tool or on a side of a capacitor plate facing away from a mould half of the tool, and which has media connections and/or media channels and/or media openings for the supply and or discharge of media for the hollow spaces of the mould half, from or to the outside. The connection plate may have pipe sections which, when the connection plate is installed according to specification, extend into the hollow spaces of the mould half. The connection plate may be used to introduce media, in particular trimming fluid, into the hollow spaces. Depending on the design, the introduction of media may be effected jointly into all hollow spaces or individually in specific hollow spaces or groups of hollow spaces.

According to a further aspect of the present invention, a method is provided for the production of one or more particle foam parts by the welding of foam particles using electromagnetic waves. This involves a tool with mould halves forming a mould cavity arranged between two capacitor plates. The mould cavity is filled with foam particles, the tool is closed by bringing the two mould halves together, and the tool with the foam particles is subjected to electromagnetic waves, in particular radio waves or microwaves, introduced into the mould cavity via the capacitor plates, wherein the foam particles are heated by the electromagnetic waves and at least partially fuse or bake together, wherein the method is implemented using the tool or tool system described above.

At the same time, one or more trimming bodies or a trimming fluid may be provided in the hollow space or at least one of the hollow spaces, in order to influence an electromagnetic field in the mould cavity.

It may also be provided, depending on the quality of the welding of the foam particles, for the arrangement of the one or more trimming bodies or the trimming fluid in the tool to be changed, in order to adjust the influencing of the electromagnetic field in the mould cavity.

It may also be provided for the arrangement of one or more trimming bodies or the trimming fluid in the tool to be varied during a foaming process, in order to have dynamic influence on an electromagnetic field in the mould cavity. By this means it is possible to react, in particular, to changing permittivity of the moulding during the foaming process.

If for example it is determined that a particle foam part is incompletely welded in a certain area, then a trimming body may be inserted adjacent to this area, by which means the electrical field in the mould cavity in which this area is produced, is intensified. If on the other hand the particle foam part is fused too much at one point, then trimming bodies may be inserted in the trimming wall mould half, in the other areas adjacent to this point, and the heat output altogether reduced by means of the electrical field either being applied for a shorter period of time, and/or the electrical field strength (or the electrical voltage in the case of an RF field applied by means of capacitor plates) being reduced.

In conjunction with the setting of the whole electrical power or heat output, this method may be used to correct both areas with too much heating and areas with too little heating.

In trimming, the trimming bodies may also be machined, in order to change their shape to match the electrical field.

In principle it is also possible to generate locally adapted fields by means of capacitor plates which are divided, and height-adjustable in the individual parts. By means of the present invention it is possible, in a mould cavity of a tool for the production of a particle foam part, to make a local adaptation of the electromagnetic field even for flat-surfaced capacitor plates, which is considerably simpler in production and handling.

To summarise, in the tool described above, the shaping tool half is so designed that the resulting relative permittivity of the tool coincides well with the relative permittivity of the particle foam. This is achieved by providing the tool half with free surfaces or volumes (one or more hollow spaces) either side of the boundary wall and supports such as for example walls or bars, where applicable also ribs, posts, honeycombs, zigzag labyrinths, etc. The relation of a volume of supporting material and air determines the desired relative permittivity and may for example amount to at least 0.05 or 0.1 and/or up to 0.3 or 0.5 or 0.7 or 0.9. If the electromagnetic field is to be intensified locally, for subsequent optimisation of the tool, then trimming bodies may be inserted in the hollow spaces. If the supports are in the form of a labyrinth, then they may already and without further expense be used as cooling or heating channels. This makes possible variable tempering with air or CO2 or another tempering medium.

The tool according to the invention facilitates design without simulation, and design rules are simply defined.

Figure 2A:
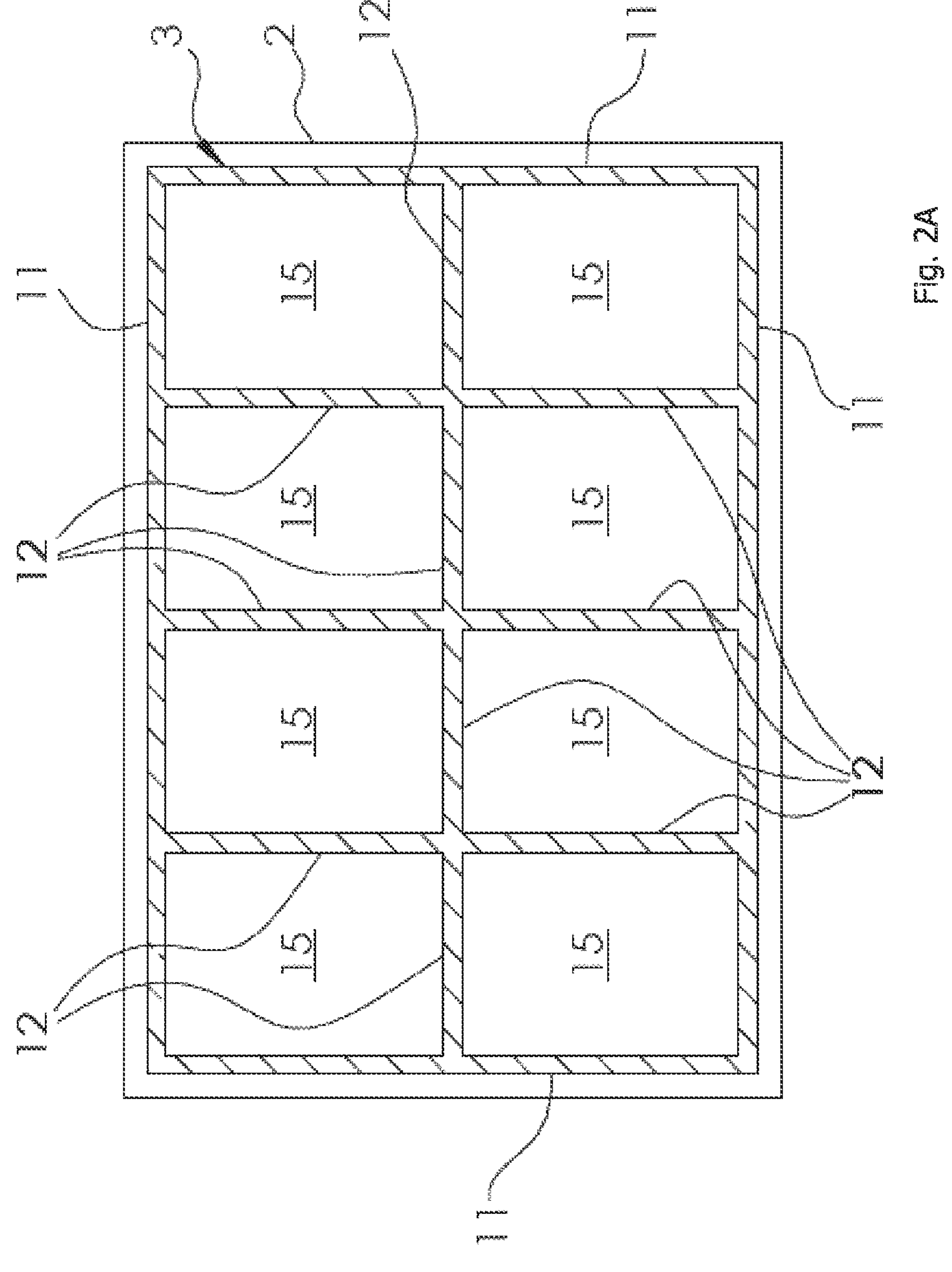
Figures 2B, 2C, 2D, 2E:
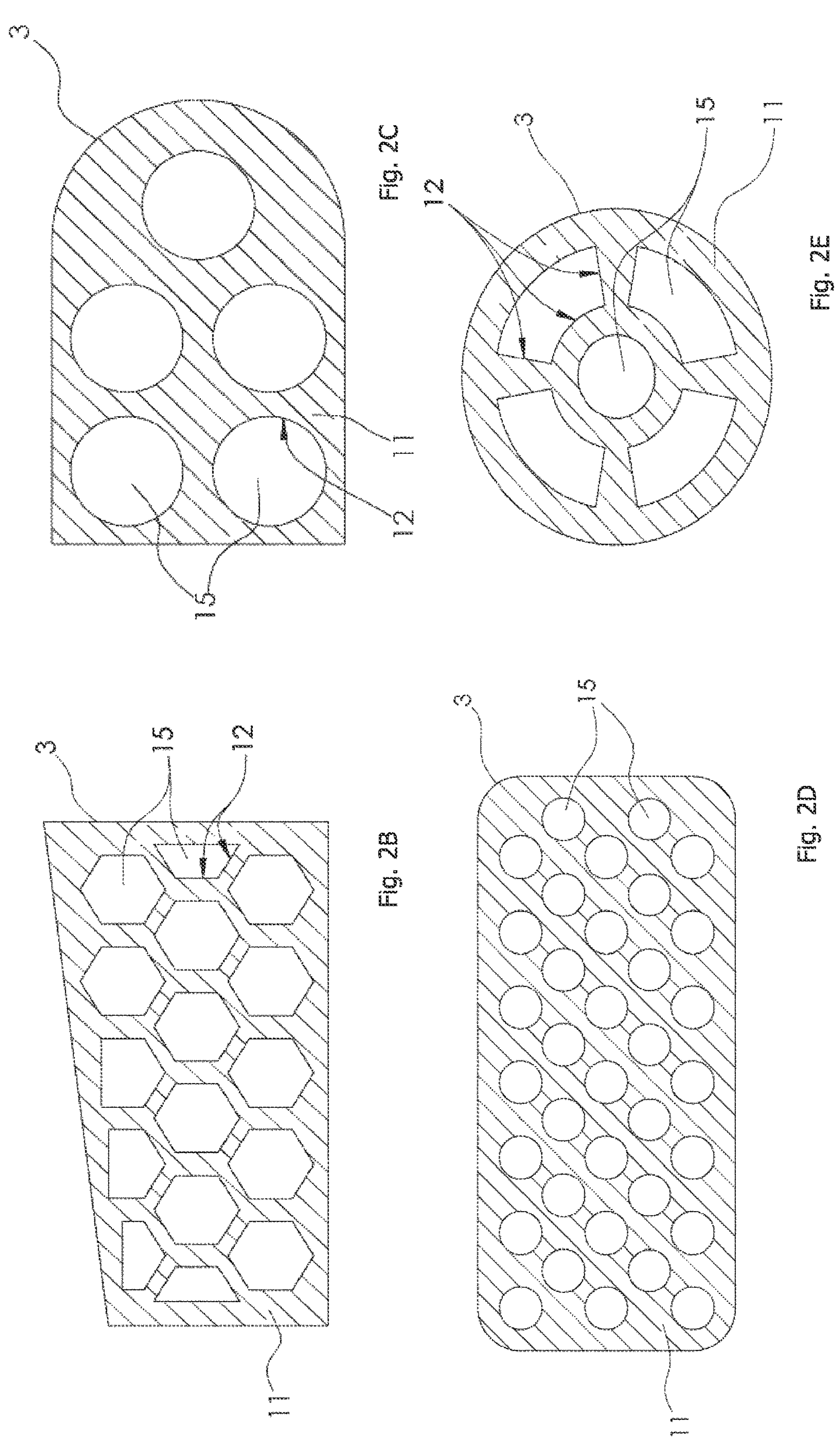

The invention is explained in detail below by way of example, with the aid of the drawings, which show in:

FIG. 1 a sectional view of an embodiment of a tool with two mould halves, in a closed position FIG. 2A a sectional view from above, along a plane indicated by a line II=II in FIG. 1, of a top mould half of FIG. 1

FIGS. 2B-2E views of mould half modifications based on FIG. 2A

Figure 3:
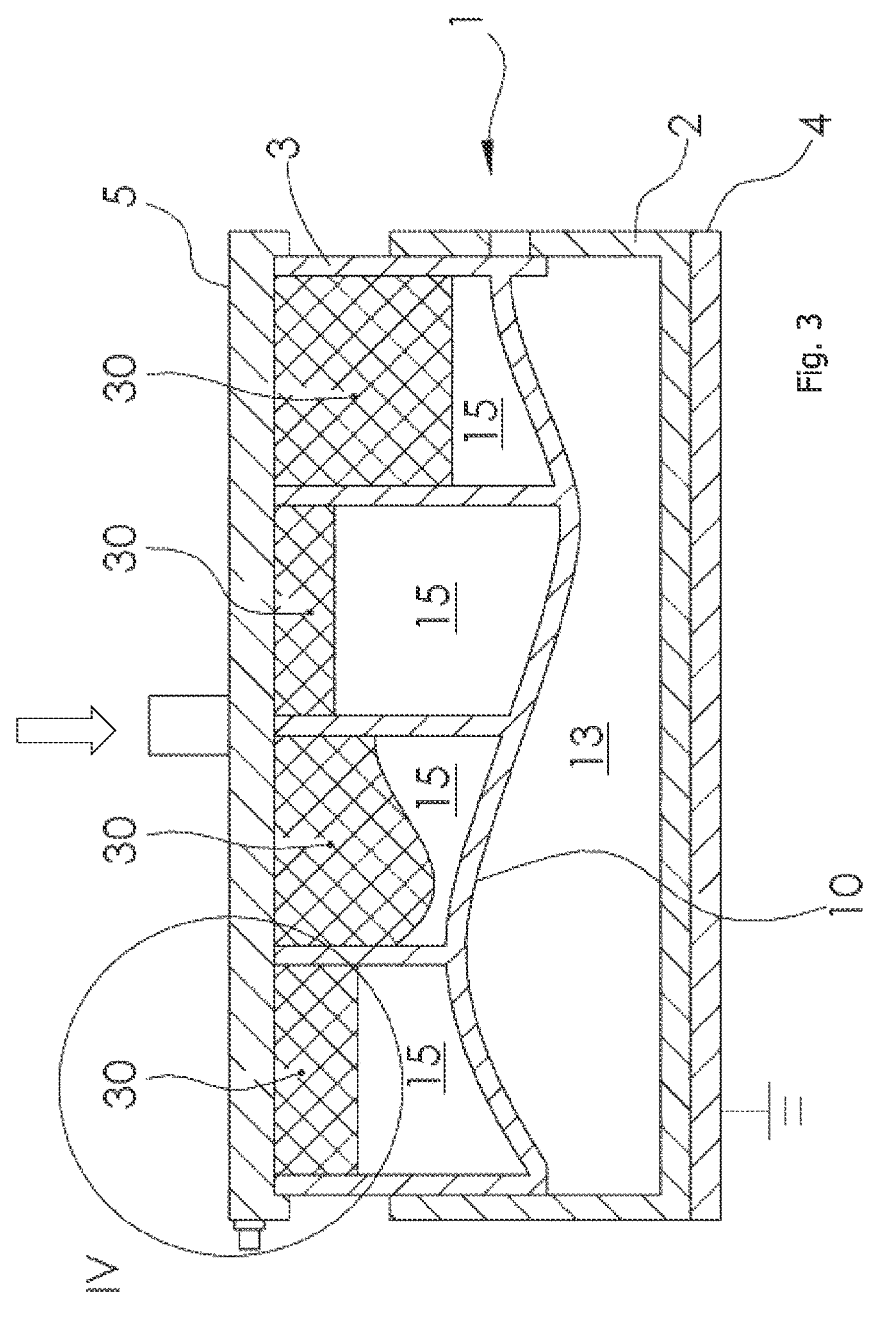
Figure 4A:
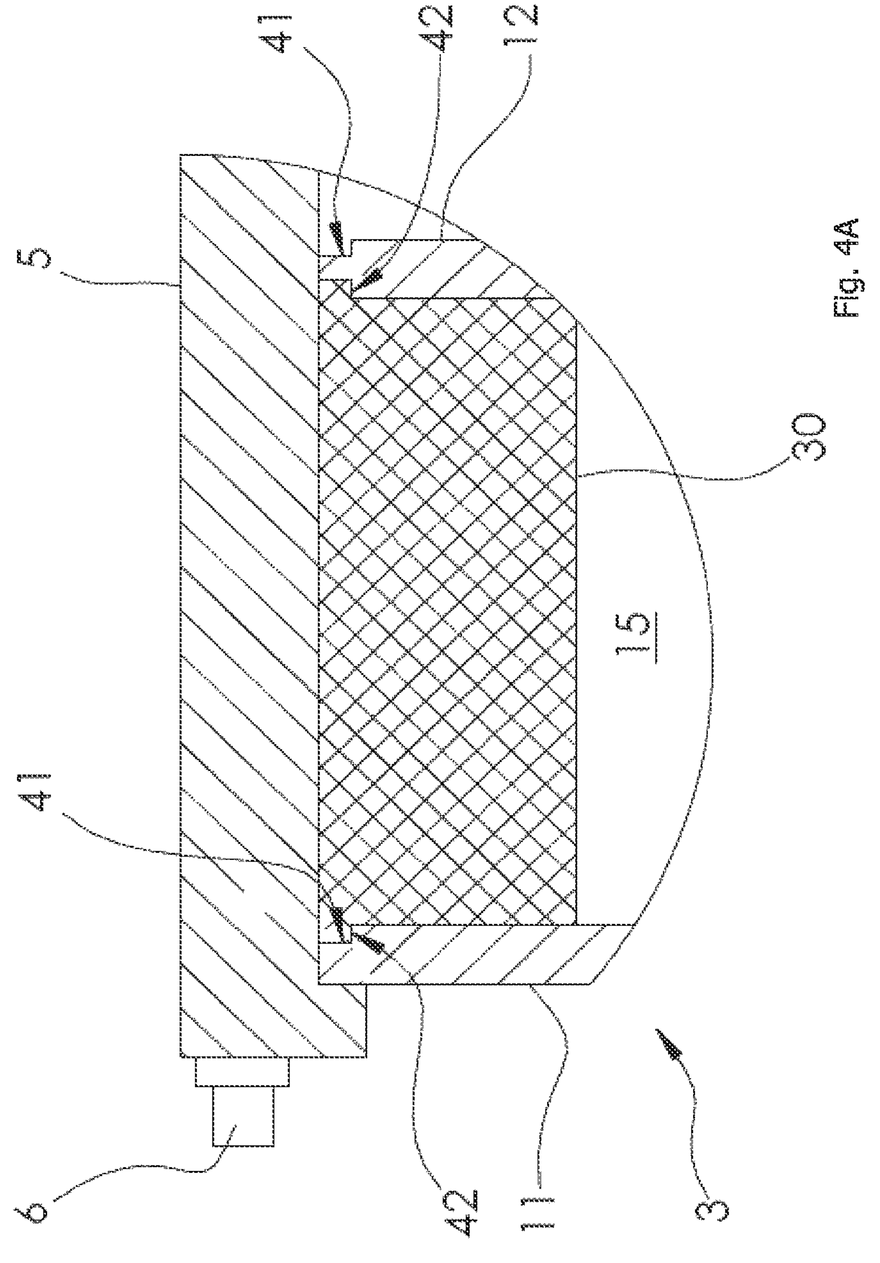
Figure 4B:
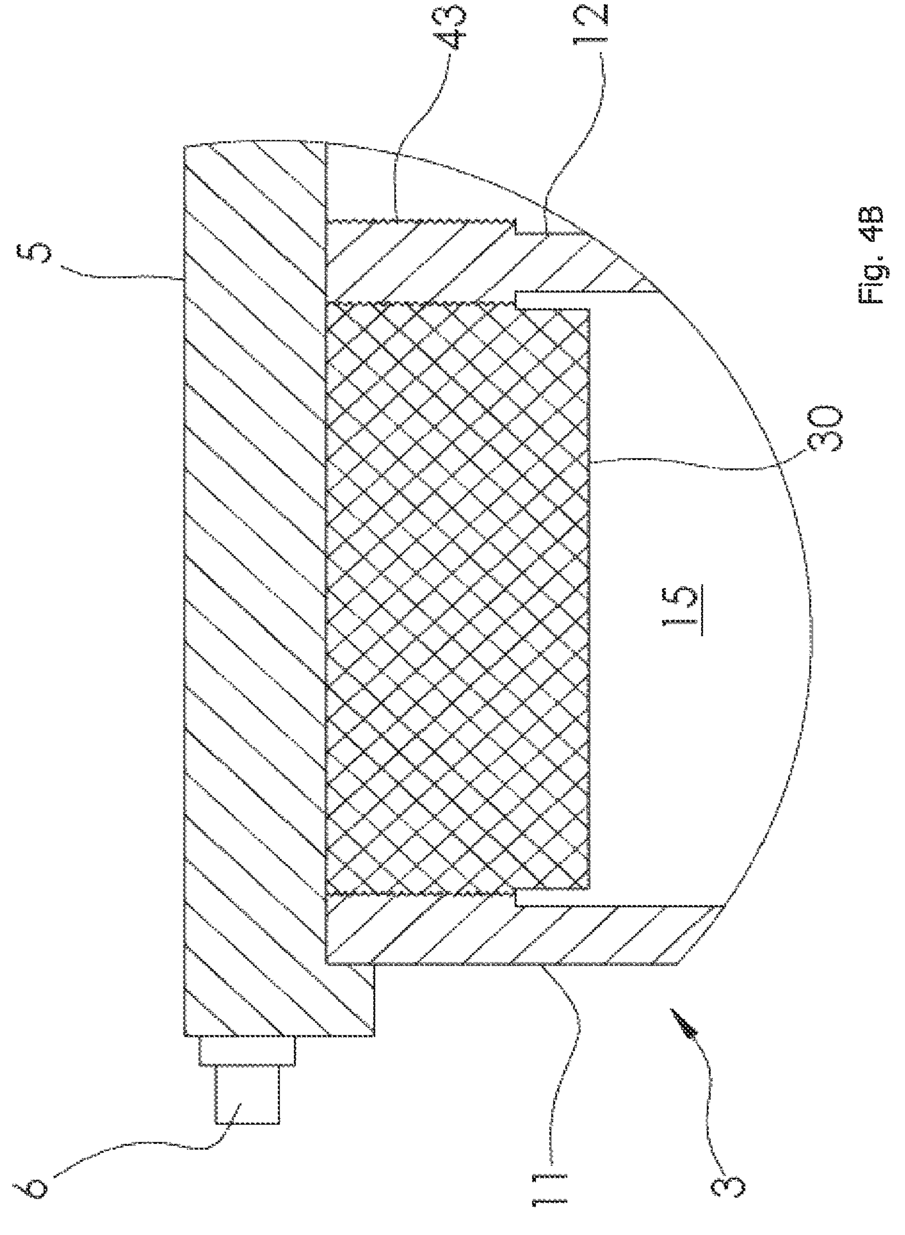

FIG. 3 an embodiment of a tool system with the tool of FIG. 1 and trimming bodies FIGS. 4A and 4B variants of a mould half with trimming bodies in an enlarged view of a detail IV of FIG. 3

Figure 5:
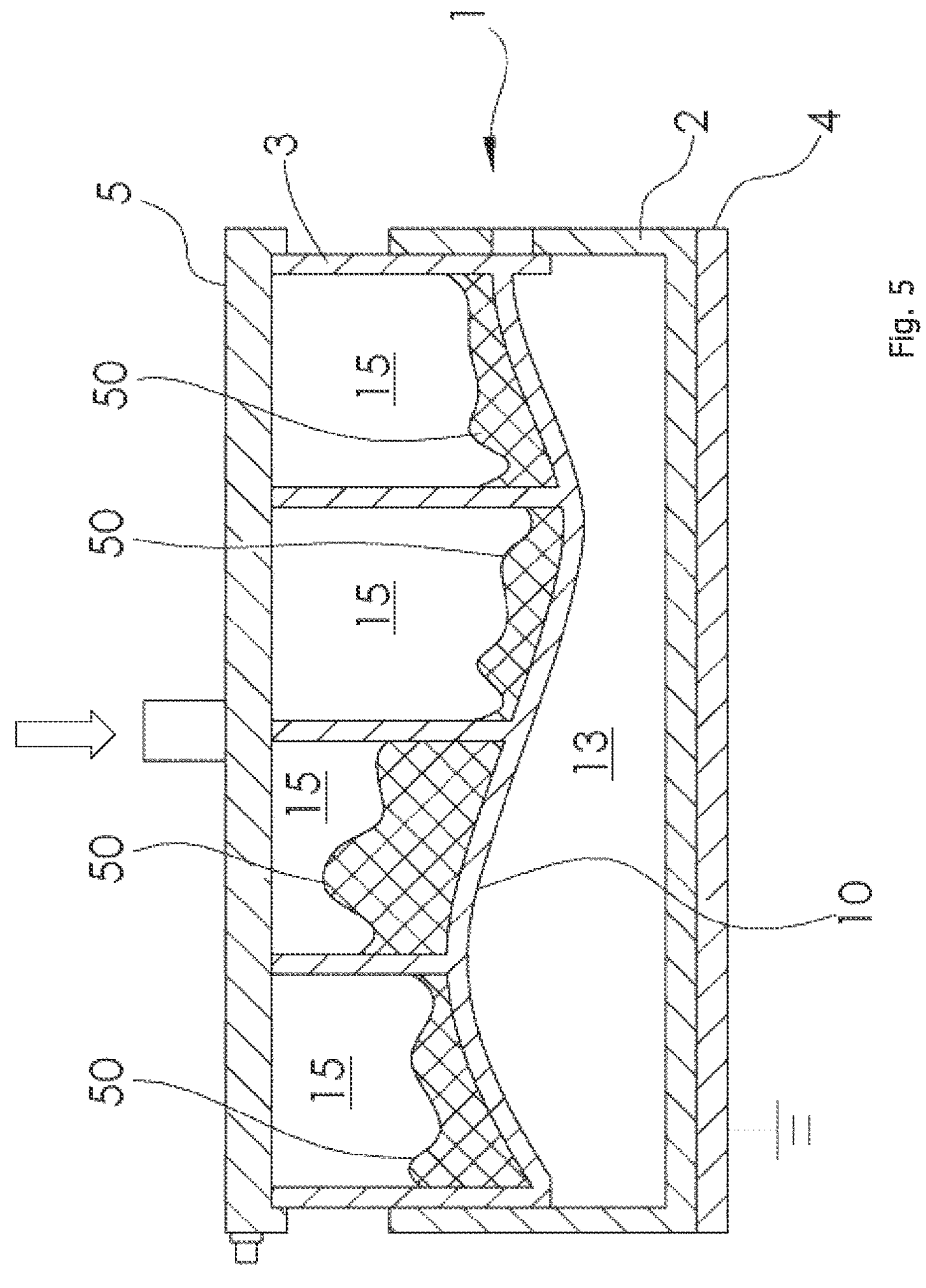
Figure 6:
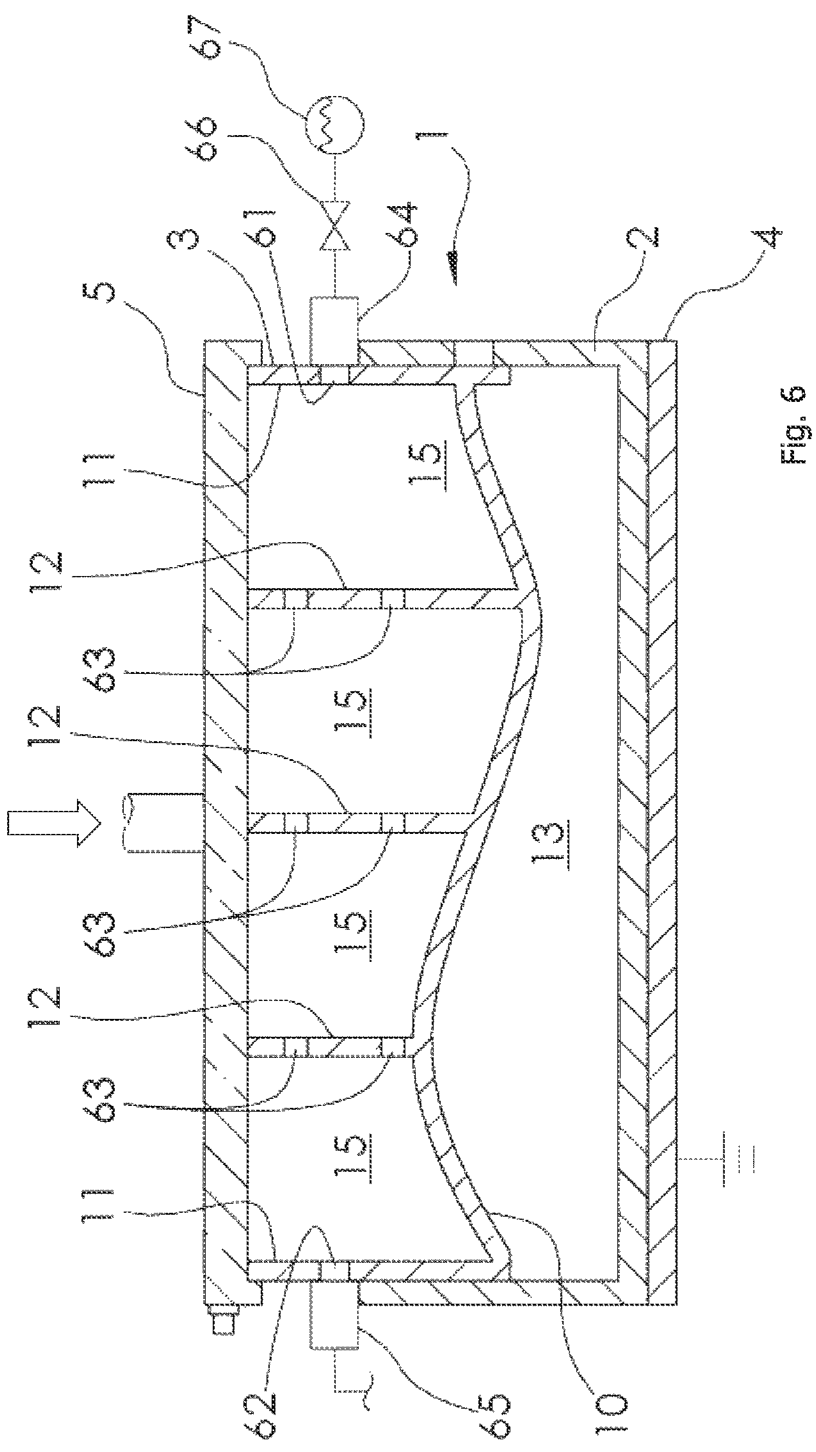

FIG. 5 another embodiment of a tool system with the tool of FIG. 1 and different trimming bodies FIG. 6 another embodiment of a tool with two mould halves in a view according to FIG. 1

Figure 7:
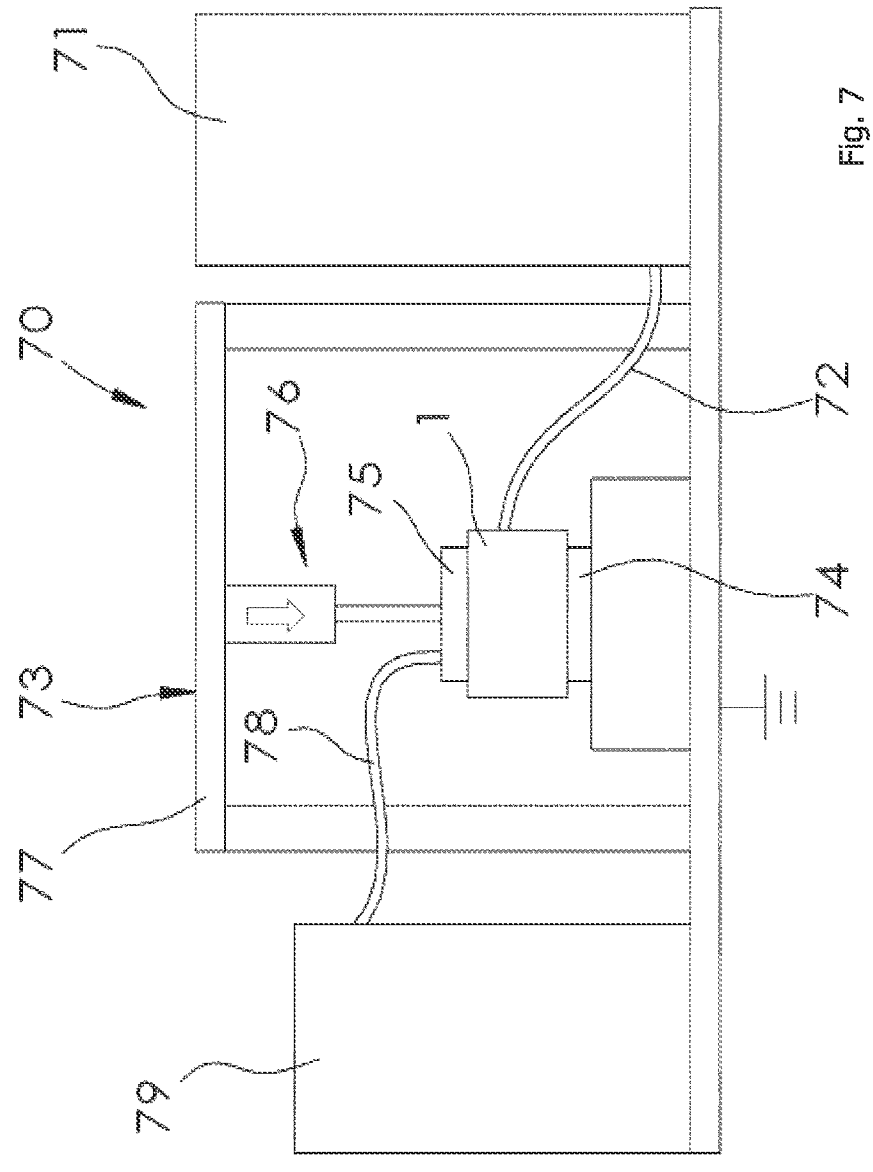
Figure 8:
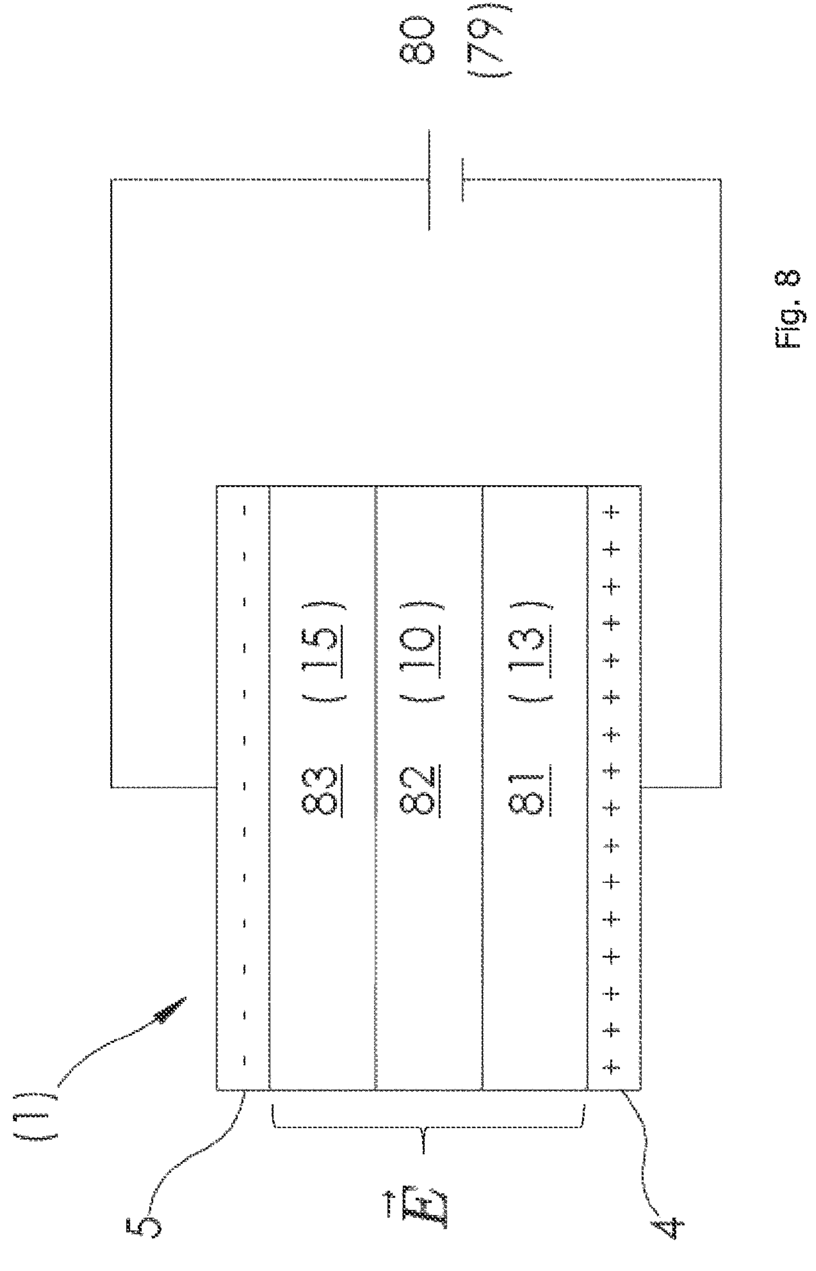
Figure 9:
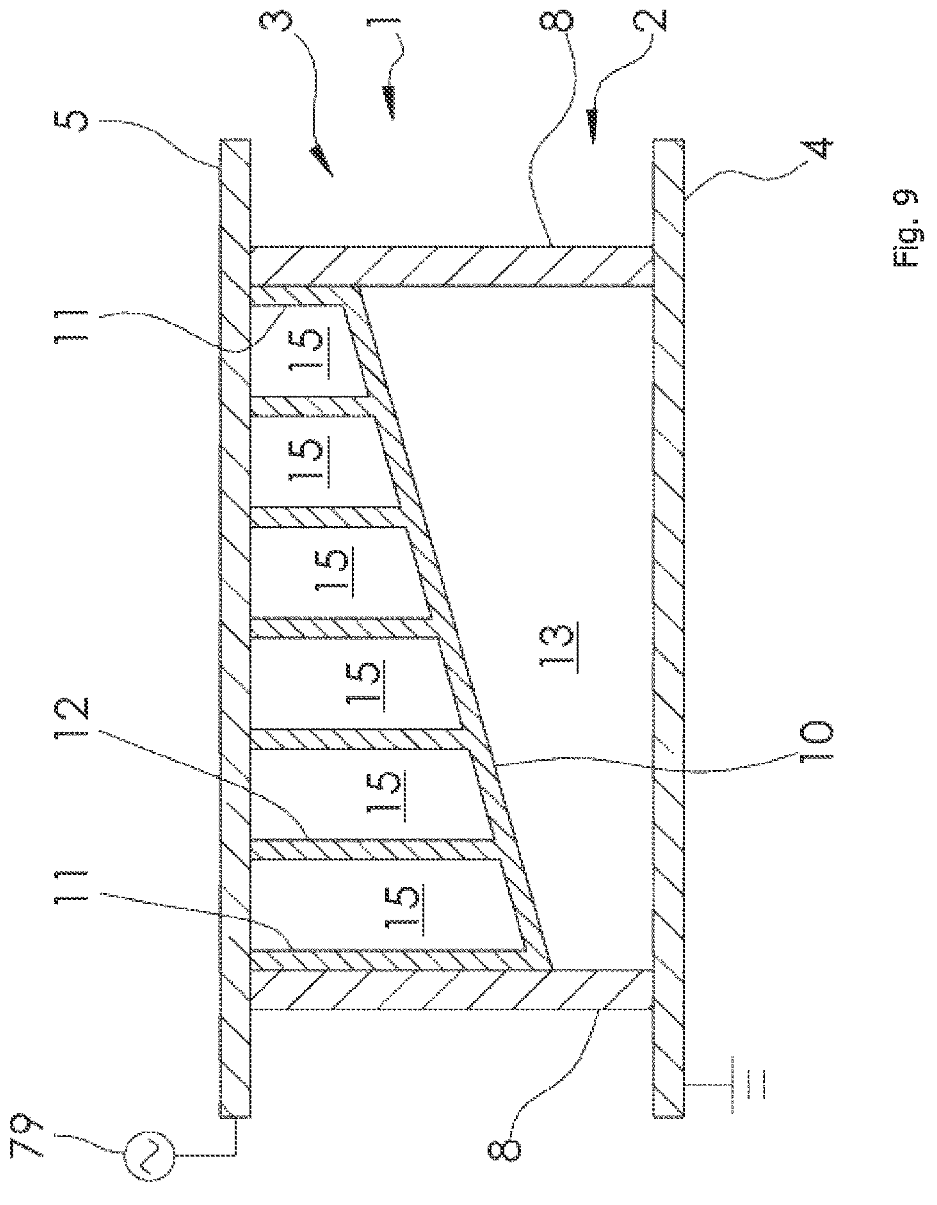
Figure 10:
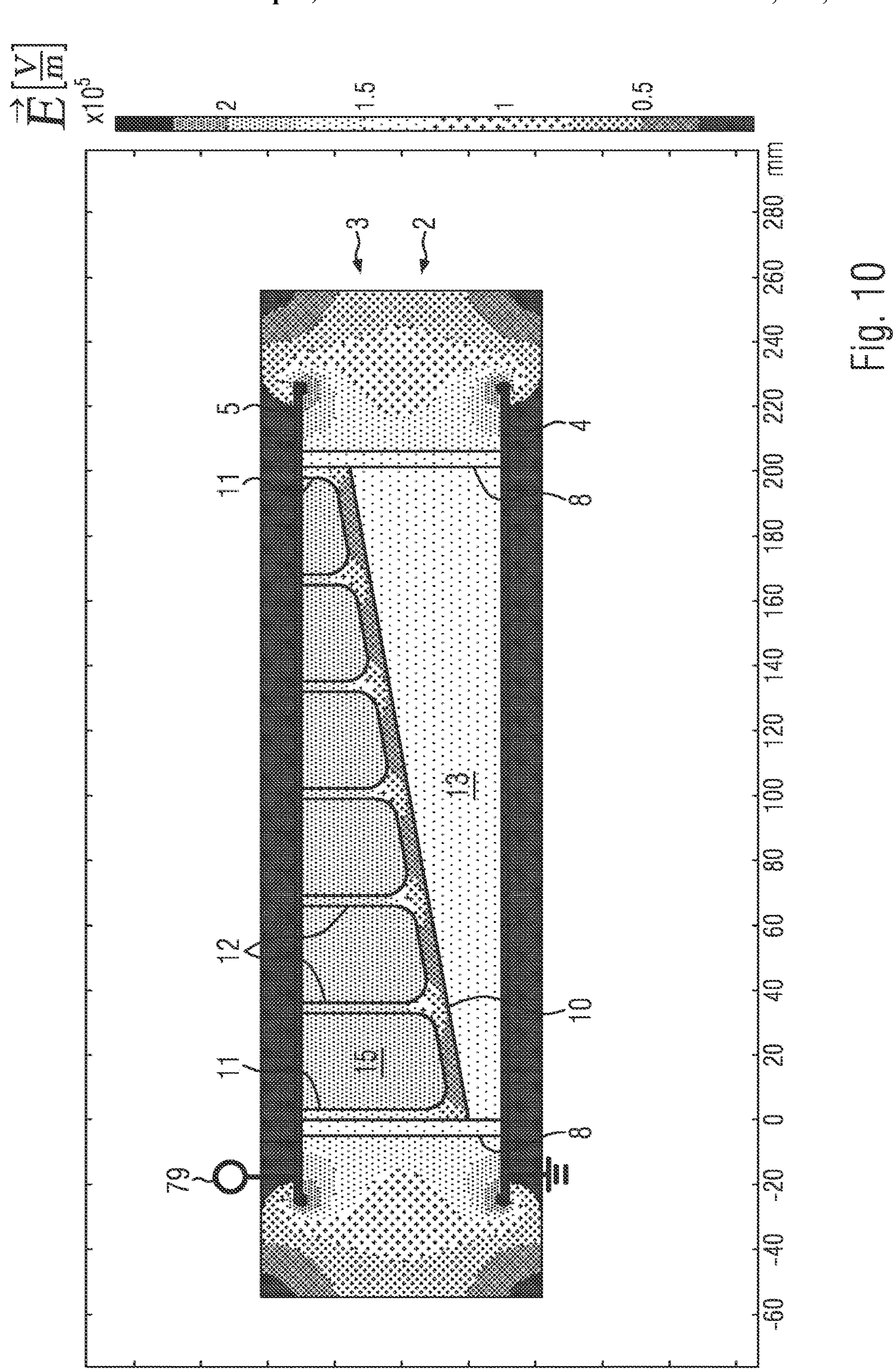
Figure 11:
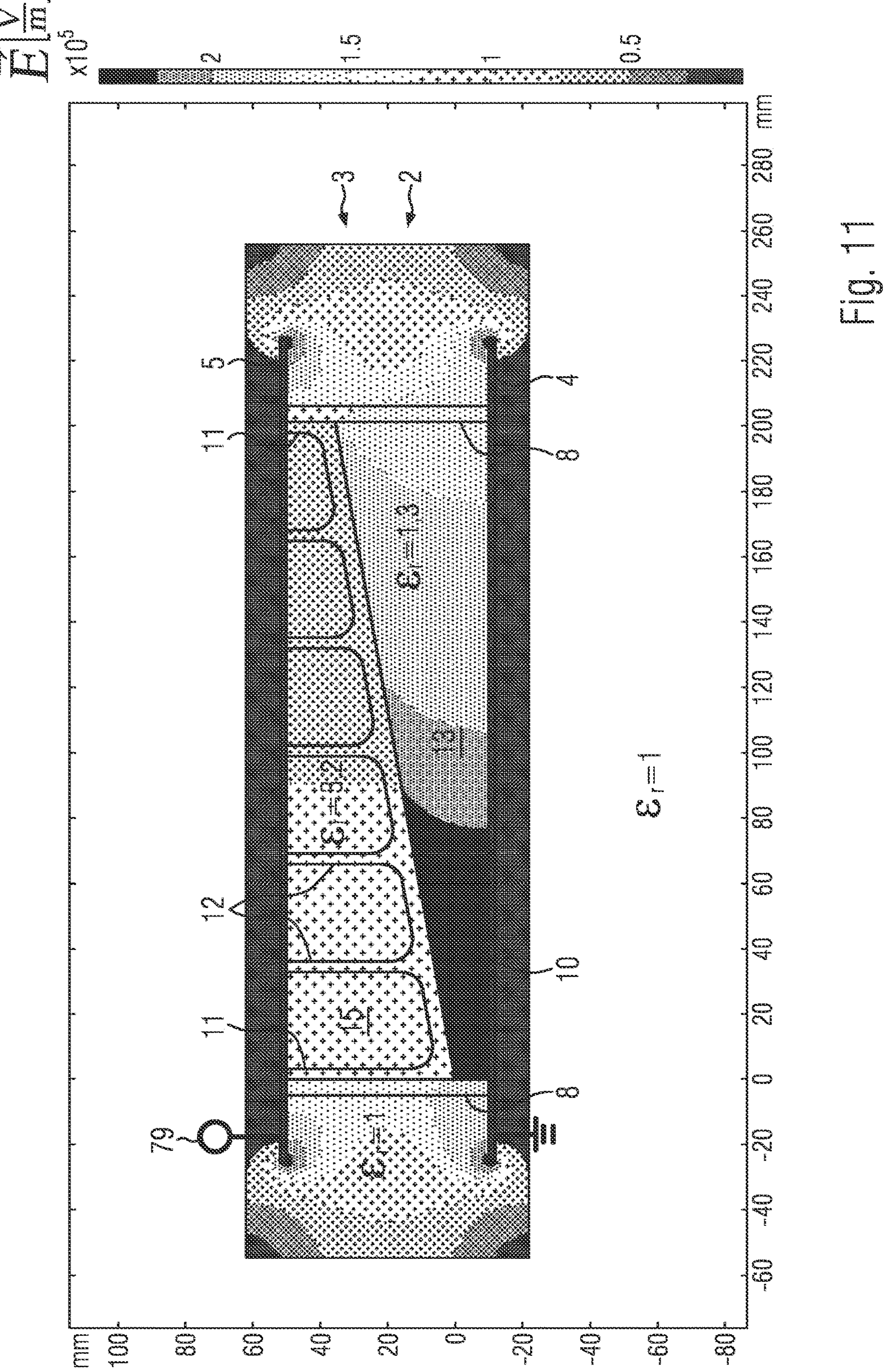
Figure 12:
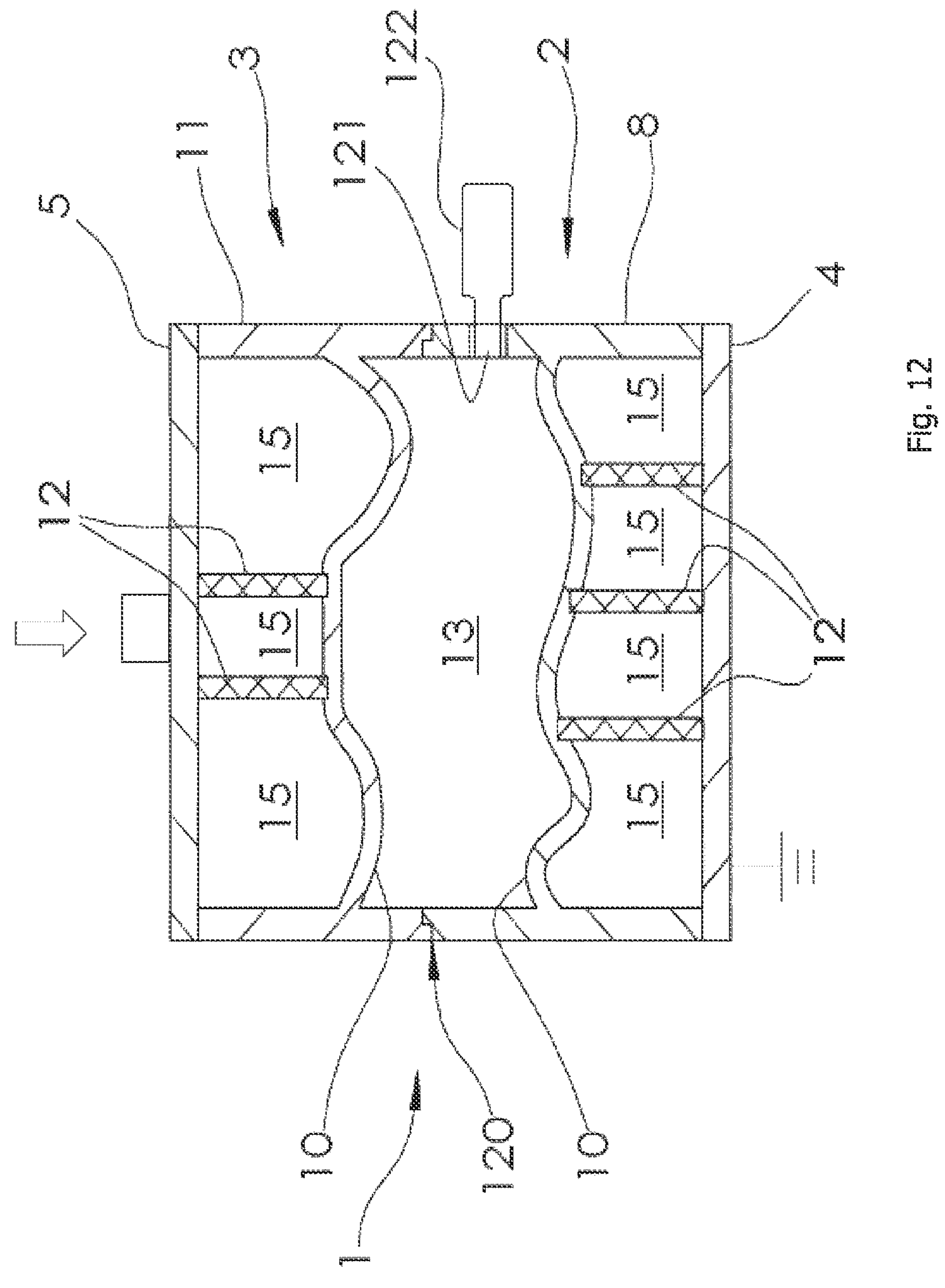

FIG. 7 an embodiment of an apparatus for the production of particle foam parts with a tool or tool system of one of the previous representations in a schematic side view FIG. 8 an equivalent image of a tool with two mould halves, based on comparative simulations to determine a field pattern in the tool FIG. 9 an embodiment of a tool with two mould halves, based on a simulation to determine a field strength pattern in the tool FIG. 10 a field strength pattern in a simulation with the tool of FIG. 8 without trimming bodies FIG. 11 a field strength pattern in a simulation with the tool according to FIG. 12 with trimming bodies FIG. 12 a sectional view of a further embodiment of a tool with two mould halves, in a closed position.

Figure 13:
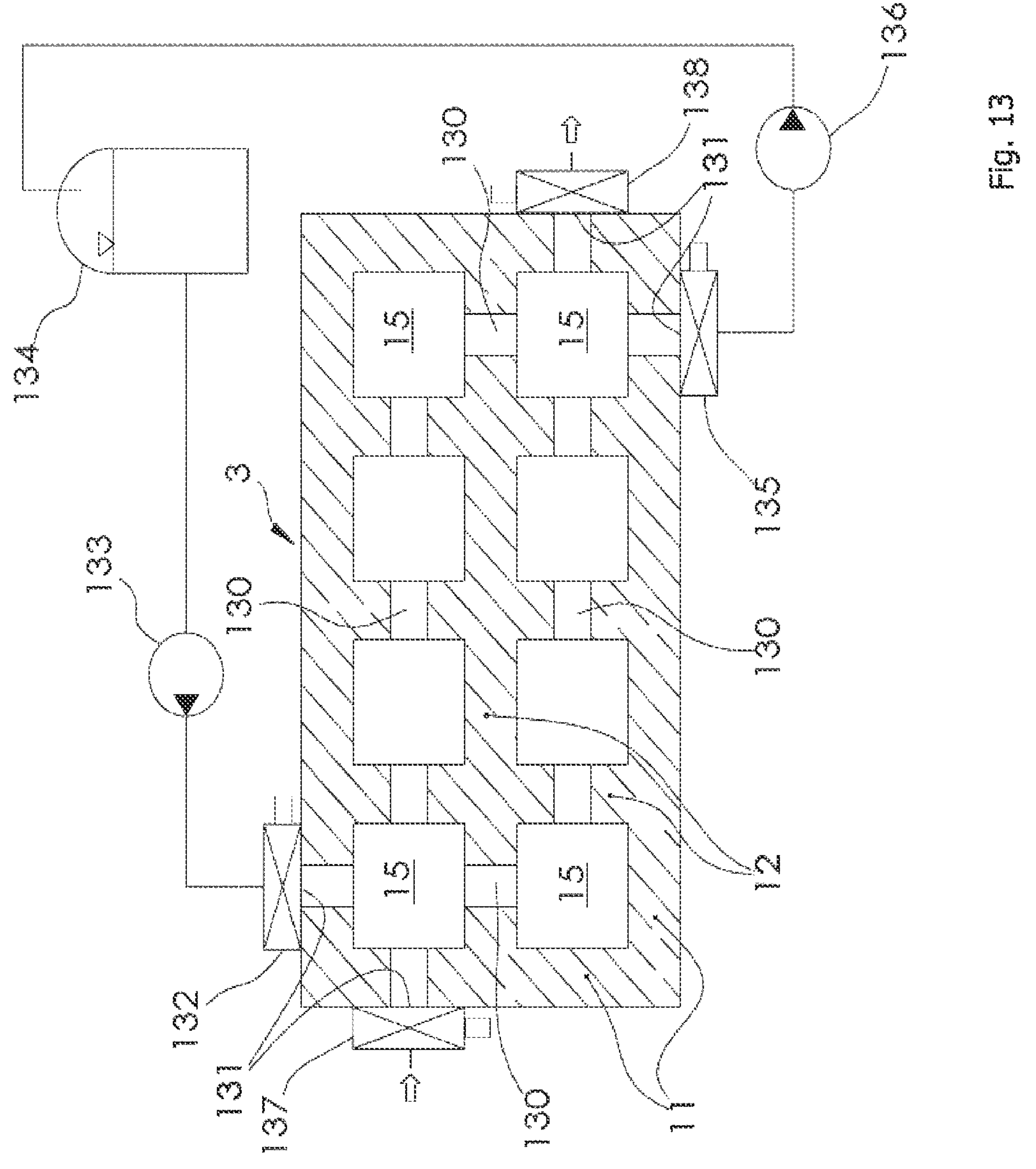
Figure 14:
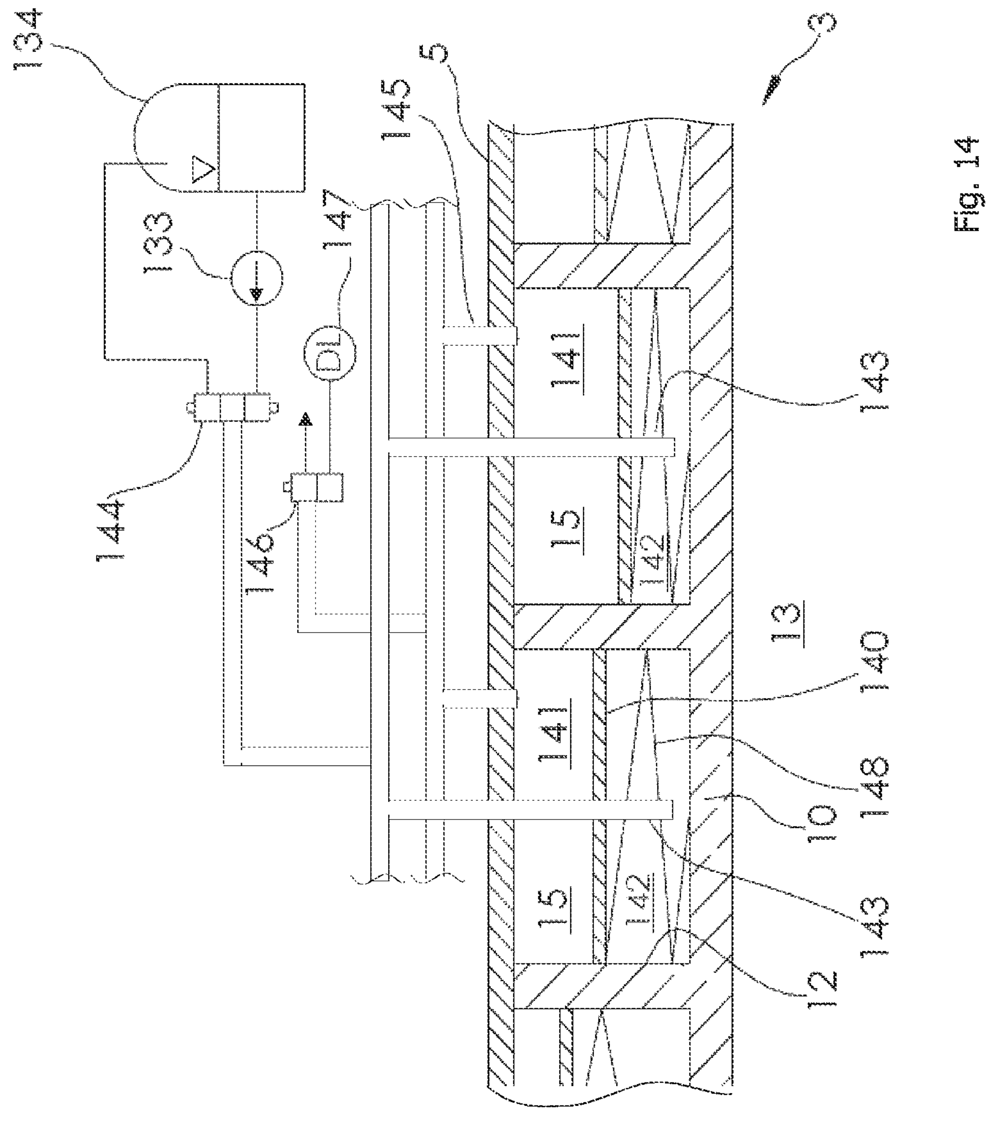
Figure 15:
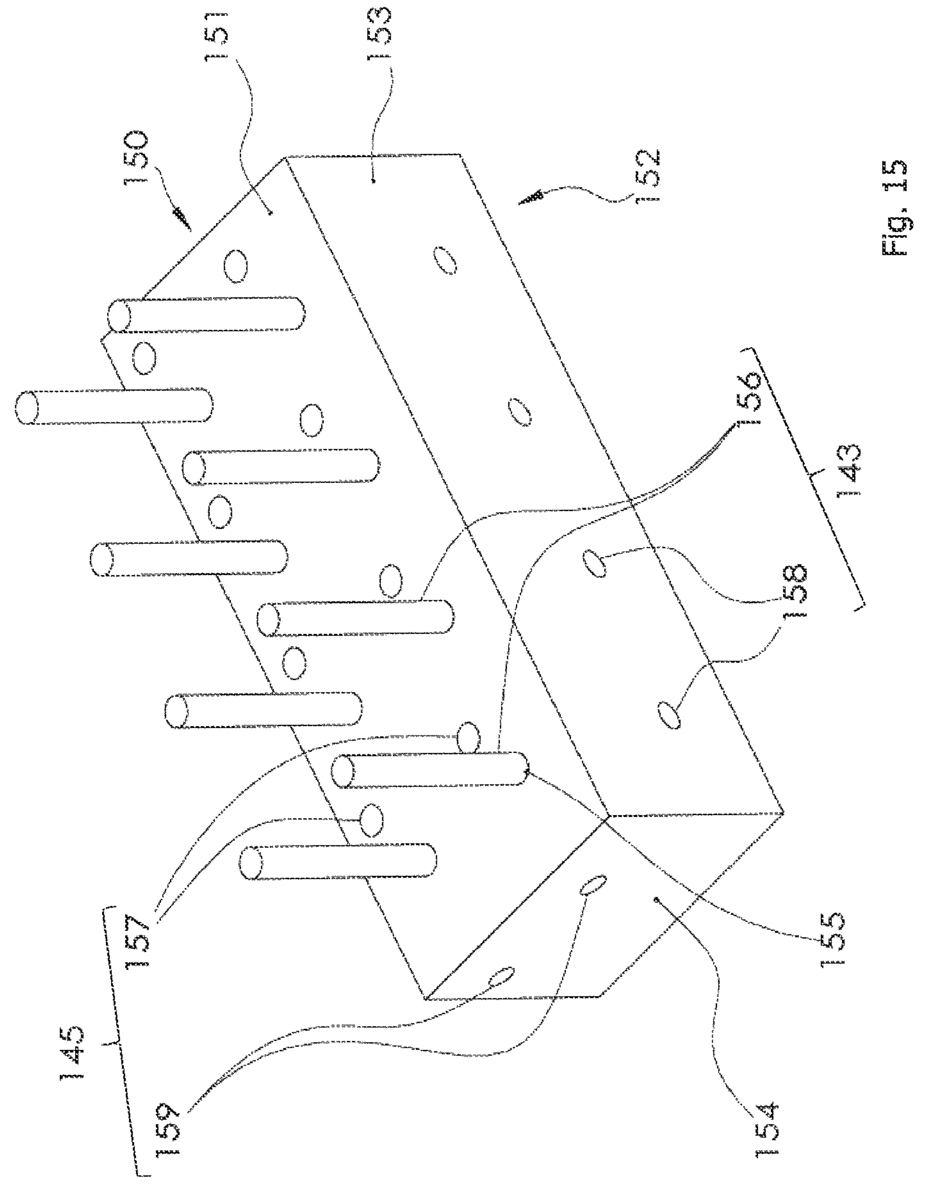
Figure 16:
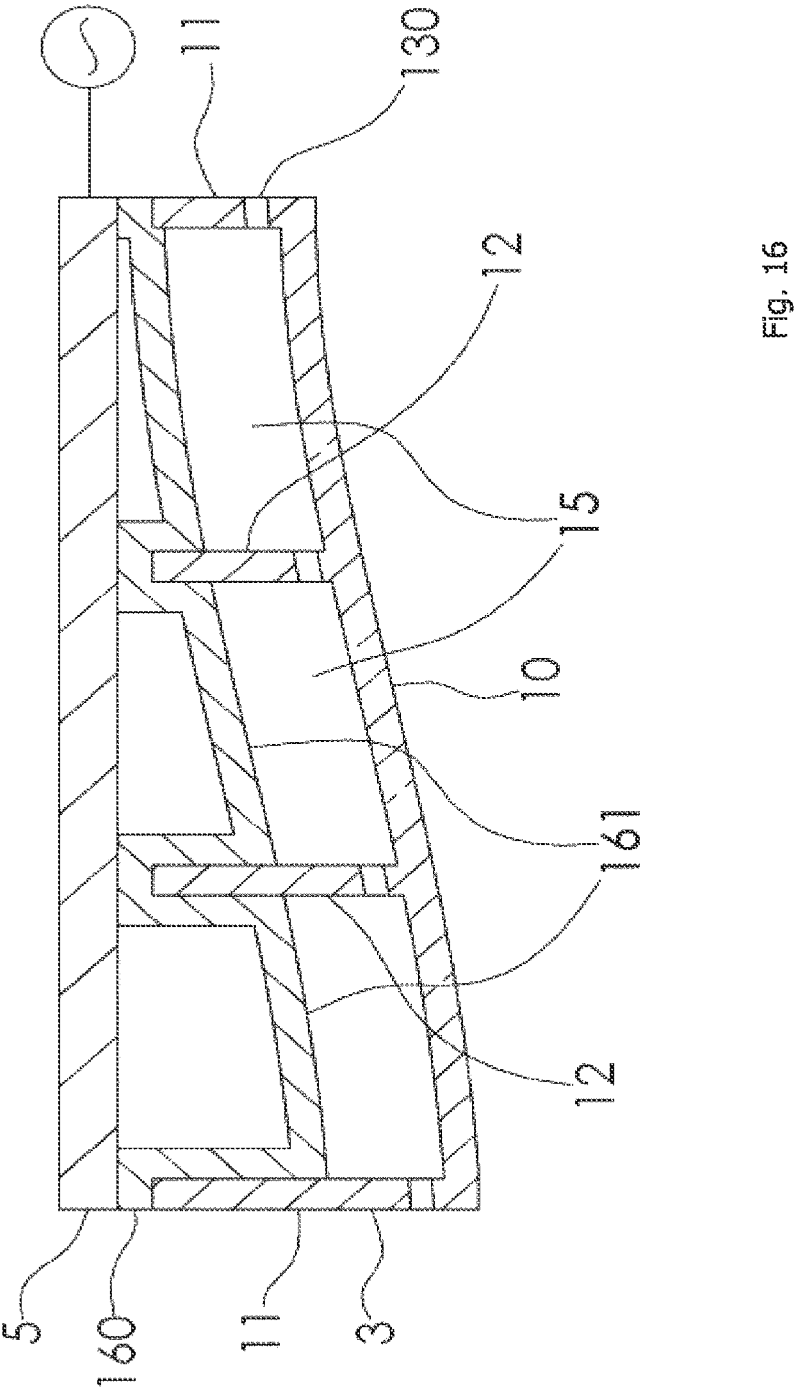
Figure 17:
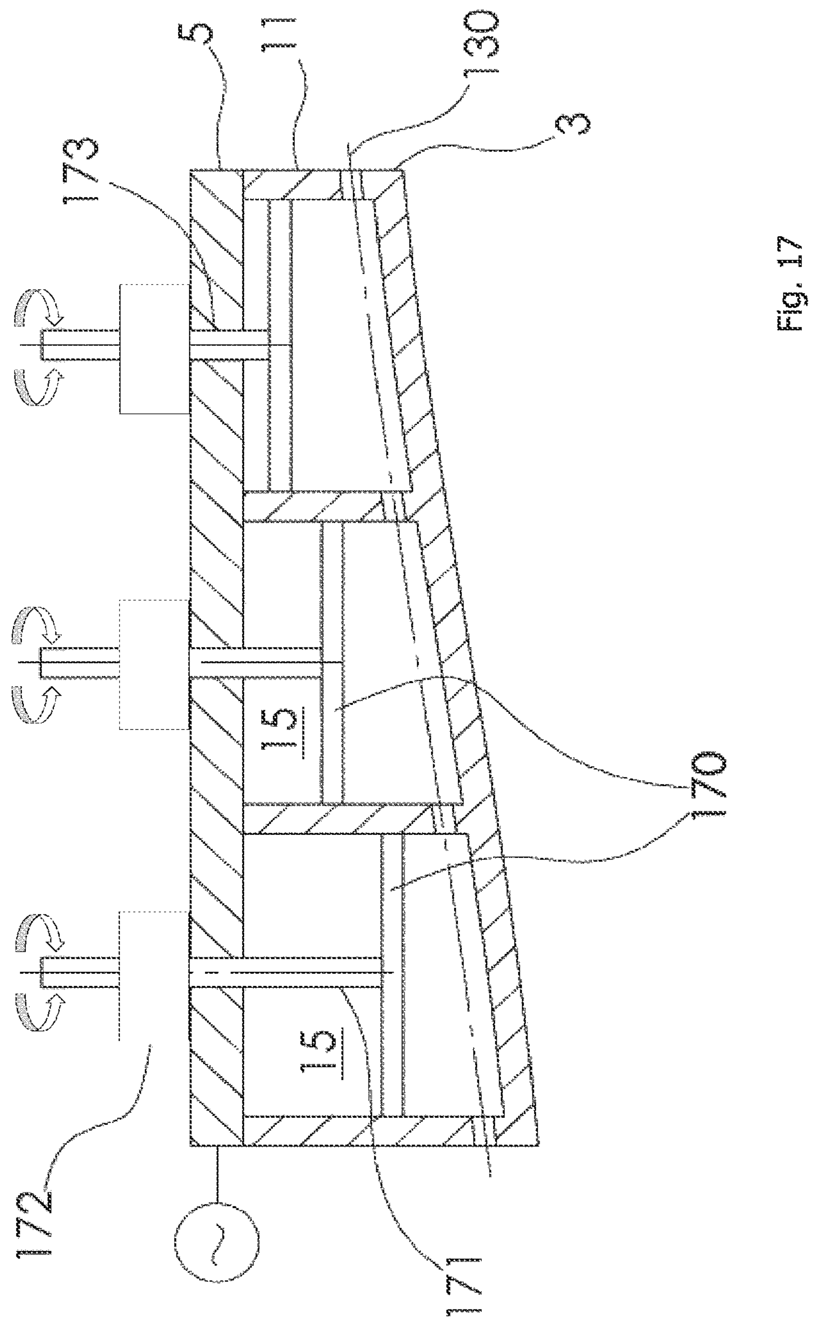
Figure 18A:
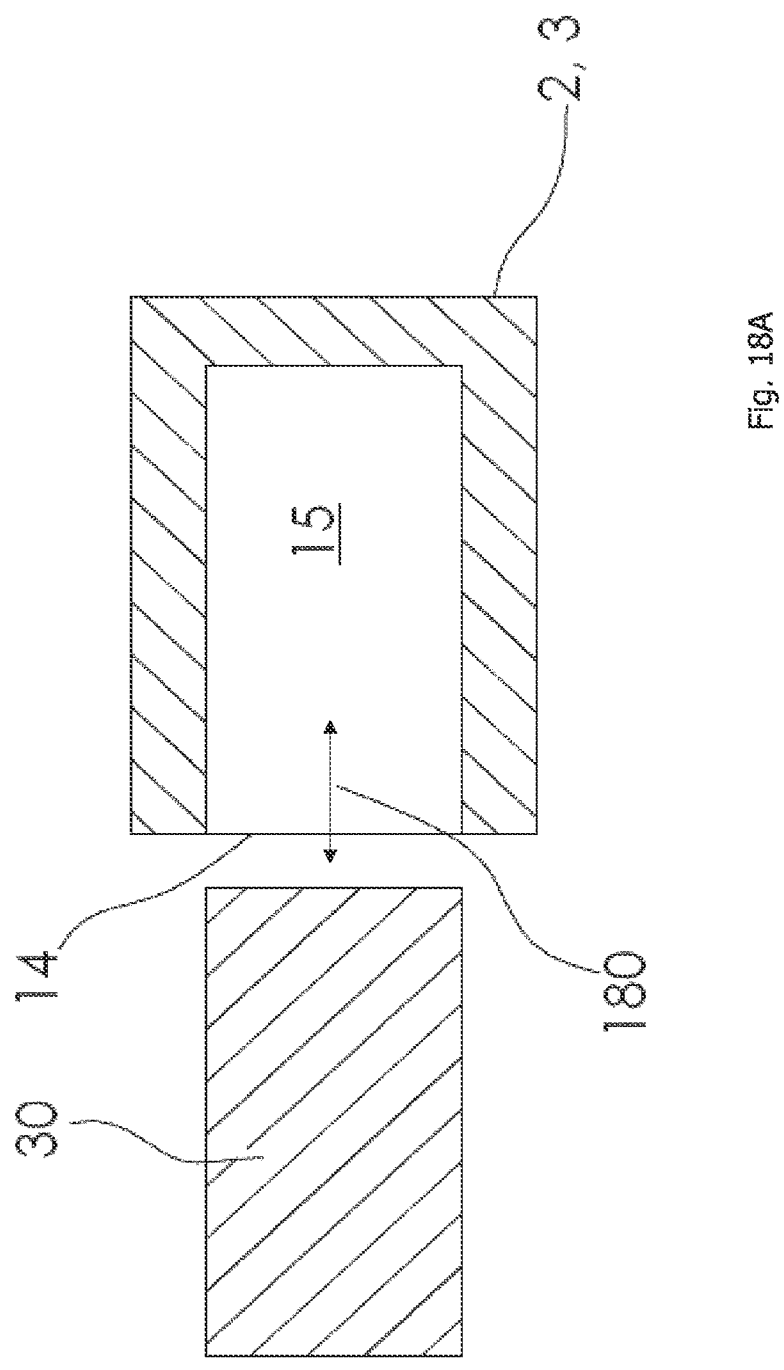
Figure 18B:
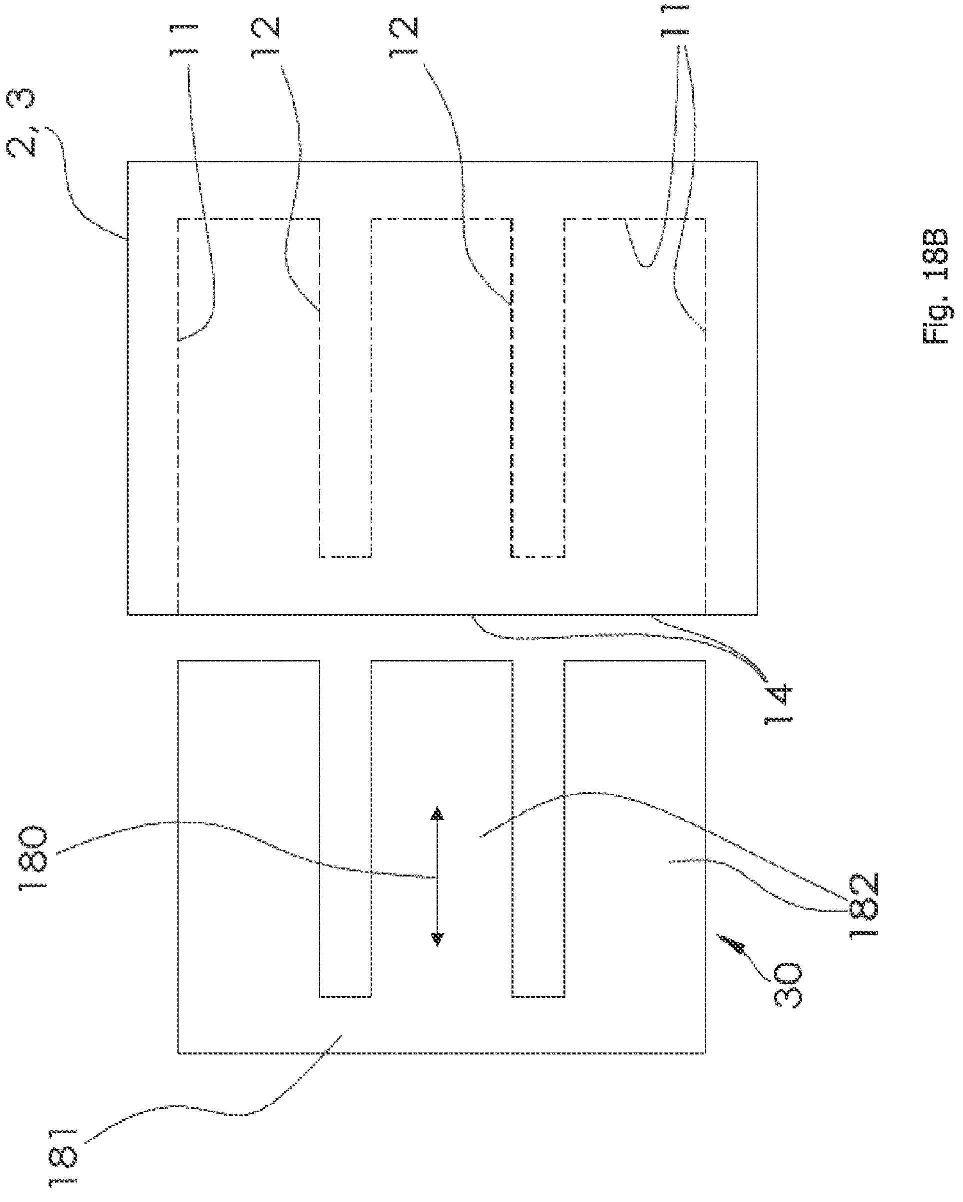
Figure 18C:
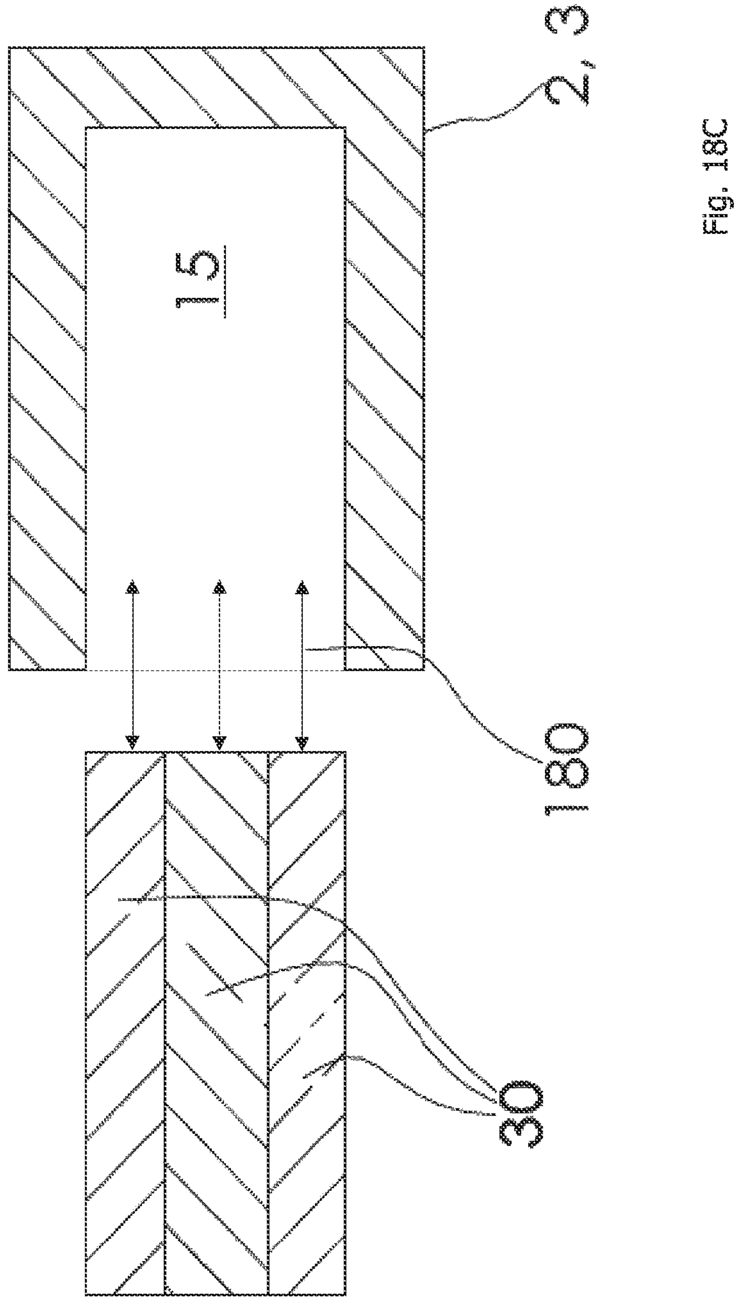

FIG. 13 a mould half of a tool according to a further embodiment of the invention FIG. 14 a mould half of a tool according to yet a further embodiment of the invention FIG. 15 a connection plate for use on a tool according to yet a further embodiment of the invention FIG. 16 a mould half of a tool according to yet a further embodiment of the invention FIG. 17 a mould half of a tool according to yet a further embodiment of the invention FIG. 18A a mould half of a tool with trimming bodies according to a yet further embodiment of the invention, in cross-section FIG. 18B the mould half with trimming bodies of FIG. 18A, viewed from above FIG. 18C the mould half with trimming bodies of FIG. 18A, in an embodiment variant.

A first embodiment of a tool 1 according to the invention for the production of a particle foam part has two mould halves 2, 3 (FIG. 1). A first mould half 2 (bottom in the Figure) is made of a base 7 and an all-round side wall 8. Provided on the outside of the base 7 is a first capacitor plate 4. The other, namely a second mould half 3 (top in the Figure) is made with a boundary wall 10 and an all-round side wall 11 and is in the form of a kind of punch, which may be introduced with minimal play into the area bounded by the all-round side wall 8, so that a mould cavity 13 is bounded between the two mould halves 2, 3, wherein the side wall 11 of the second mould half 3 faces away from the mould cavity 13. The second mould half 3 is therefore described as the punch mould half 3, and the first mould half 2 as the die mould half 2. On the same side as the side wall 11, several bars 12 protrude from the boundary wall 10. The bars 12 are joined to the side wall 11 and end on a plane on which lies a second capacitor plate 5. The bars 12 and the side wall 11 of the punch mould half 3 are therefore supports for the purposes of the invention, serving to support the boundary wall 10 on the second capacitor plate 5. The second capacitor plate 5 has a waveguide connection 6 for the connection of a waveguide. The side walls 11 and bars 12 of the punch mould half 3 form with one another and with the boundary wall 10 in each case hollow spaces 15, each having an opening 14 at the top. It is therefore to be noted that the hollow spaces 15 face away from the mould cavity 13. The second capacitor plate 5 is or may be connected to a piston rod of a press, in order to move the punch mould half 3 relative to the die mould half 2, and in particular to insert the punch mould half 3 in the die mould half 2 (direction of a framed arrow in FIG. 1).

On the side wall 8 of the die mould half 2 is a filler hole 9 for feeding foam particles into the mould cavity 13 (FIG. 1). A vent hole (not shown) may also be provided on the side wall 8, through which air can escape during filling of the mould cavity 13.

The tool 1 is provided for the production of particle foam parts by welding of foam particles fed into the mould cavity 13 using electromagnetic waves. For this purpose the first capacitor plate 4 may be connected to ground or earth and the second capacitor plate 5 may be connected via the waveguide connection 6 to a wave generator. On connection of a wave generator such as an RF or microwave generator, a high-frequency electromagnetic field is generated in the mould cavity 13. Through the energy of the electromagnetic field, the foam particles are fused and welded together.

The strength of the electromagnetic field prevailing in the mould cavity 13 depends on the properties of the materials present between the capacitor plates 4, 5, and in particular on their relative permittivity εr. The relative permittivity εr is defined as the ratio between the permittivity of a material or medium and the permittivity of the vacuum, the electromagnetic field constant ε0. The relative permittivity εr is material-dependent and may be understood as a measure of the field weakening effects of a dielectric polarisation of the material. The greater the relative permittivity εr of a material, the greater the field weakening.

For air for example the relative permittivity εr lies close to the electrical field constant ε0, precisely at εr=1.00059. Further examples of relative permittivity are:

- for Teflon, εr=2
- for paraffin, εr=2.2
- for kiln-dried wood, εr=2 . . . 3.5
- for PE and PET, εr=3.5
- for PEEK, εr=4
- for ABS, εr=4.3
- for porcelain, εr=2 . . . 6
- for glass, εr=6 . . . 8
- for tantal pentoxide, εr=27
- for barium titanate, εr=15,000 (from Helmut Benkert, Einfuerhung in die Technische Keramik [Introduction to Technical Ceramics], http://www.keramverband.de/keramik/pdf/02/sem02_03.pdf)

(in each case at roughly 18° C. and 50 Hz, after https://de.wikipedia.org/wiki/Permittivitaet, unless otherwise stated). The above examples are intended only as an overview, and in no way restrict the possible choice of materials for elements specified in this application, such as for example the mould halves 2, 3 or the trimming bodies 30, 50 described later.

The mould halves 2, 3 are transparent to (i.e. in principle permeable by) electromagnetic waves, in particular those with a wavelength of the waves generated by the wave generator. I.e. at least the base 7 of the die mould half 2 and the boundary wall 10 of the punch mould half 3 are made from a dielectric which has for example plastic, wood, ceramics, glass or the like. The foam particles fed into the mould cavity 13 likewise have dielectric properties. Not only due to irregular geometry of the mould cavity 13, but also with locally differing materials in the foam particles together with influences from the mould halves 2, 3 themselves, it is possible for locally different field strengths of the electromagnetic field to prevail in the mould cavity 13 and in the particle foam part to be created, and/or for the energy of the electromagnetic field to be absorbed with locally varying strength by the foam particles in the mould cavity 13. Such irregular field strengths and/or absorption rates may be desired, for example because the fusing properties of different foam materials may vary, but it may also be undesired. This may lead to insufficient or excessive heating and thus to undesired results in foam particle fusing. To remedy this problem, the hollow spaces 15 of the punch mould half 3 are provided, which considerably reduce the mass of material in the punch mould half 3. This in turn leads to an advantageous reduction in the influence on the electromagnetic field strength in the mould cavity 13, which considerably enhances flexibility in use and in shaping of the mould cavity 13, also of the punch mould half 3. These and other advantages have already been described at the start of this application, so that they are only referred to at this point.

The hollow spaces 15 may also be used for trimming the punch mould half 3, in order to influence the electromagnetic field in the mould cavity 13. By suitable trimming, the electromagnetic field in the mould cavity 13 may be so influenced that an even or otherwise desirable field strength prevails in the mould cavity 13. For example it may be desirable to have locally differing field strengths in the case of locally differing particle materials with different relative permittivity, for locally varying material strengths and locally different material densities. For example it has been found that, at points of low material strength (i.e. a low height of the mould cavity 13), higher material densities occur due to closing of the tool. Since compacted foam particles absorb the applied electromagnetic field more strongly, such points may be subject to more intensive heating than adjacent points. It may therefore be observed that, at points of greater compaction, the foam particles are too strongly fused or even burned or charred, and/or that welding of the foam particles is inadequate at adjacent points. It may therefore be desirable to have lower field strength at the points of greater compaction of the foam particles than at adjacent points. The same applies to material mixes with sections of more strongly absorbing foam particles and sections of less strongly absorbing foam particles. It may also occur that the tool 1 and the foam selection have been matched to one another in advance with the aid of models or tests, but later in series production, variances in fusing behaviour occur, for example through the use of a modified formulation, or even just another batch of foam particles. In all these cases it may be desirable to influence the electromagnetic field in the mould cavity 13.

For this purpose, trimming bodies 30 may be inserted into the hollow spaces 15 through the openings 14 (FIG. 3). The trimming bodies 30 are made of a dielectric material. Due to the polarising properties of a dielectric, the electromagnetic alternating field is weakened by the dielectric lying in the path of the field lines. In areas on the path of these same field lines, which are kept free from the dielectric, the field is on the other hand not weakened, but is even intensified. The electrical field may thus be influenced in different ways by means of trimming bodies 30 of varying size, shape and permittivity.

In order to fix the position of the trimming bodies 30 in the hollow spaces 15, the side walls 8 and bars 12 of the punch mould half 3 may have steps 41 in the area of the openings 14, and the trimming bodies 30 may have rims 42 or similar shaped features on top, which rest on the steps 41 on insertion of the trimming bodies 30 (FIG. 4A). Alternatively, the side walls 8 and bars 12 of the punch mould half 3 may have latching elements 43 in the area of the openings 14 or throughout or in other areas, and the trimming bodies 30 may have on the side corresponding shape features which engage with the latching elements 43 on insertion of the trimming bodies 30 (FIG. 4B). Alternatively, the trimming bodies 30 may be so designed that they are held in the hollow spaces 15 by simple friction.

Instead of trimming bodies 30 preformed as plug-in bodies as described above, trimming bodies 50 may also be formed by introducing a mouldable dielectric material into the hollow spaces 15 (FIG. 5). In this case, the trimming bodies 50 may be attached especially easily to the inside of the boundary wall 10. After insertion, the dielectric material of the trimming bodies 50 may be hardened or adhere with great toughness to the material of the second mould half 3.

The trimming bodies 30, 50 are preferably made from a material with a relative permittivity (εr) of at least 2. The greater the relative permittivity (εr) of the material of the trimming bodies 30, 50, the greater is their effect on the trimming of the mould half 3, in order to influence an electromagnetic field in the mould cavity 13. Consequently, even materials with a relative permittivity (εr) of at least 3 or at least 4 may be expedient. The lower the relative permittivity (εr) of the material of the trimming body, the more precisely and finely the electrical field in the mould cavity may be set. Materials with a low relative permittivity (εr), for example less than 2, may therefore also be sensible.

Of course it is conceivable, depending on requirements, that not all hollow spaces 15 are filled with a trimming body 30, 50. It is also conceivable that the second mould half 3, on the basis of preliminary tests or simulations, is prepared with primary trimming bodies 30, 50 and subsequently, with the aid of actual, possibly changing circumstances in series production, as shown by the foaming results, is fine-trimmed with secondary trimming bodies 30, 50. Here the primary trimming bodies may be in the form of trimming bodies 50 of a mouldable compound (FIG. 5), while the secondary trimming bodies are made as trimming bodies 30 with a fixed geometry (FIG. 3), or vice-versa, or in each case one of both. It is also conceivable that a primary trimming body 30 of fixed geometry has a further hollow space, in which a secondary trimming body 30, 50 of fixed geometry or of mouldable material may be inserted.

In the embodiments described and illustrated, the hollow spaces 15 are filled only in part with a trimming body 30, 50. As a result it is possible to use the remaining space for tempering with a tempering medium. In a further embodiment, the side wall 11 of the punch mould half 3 may have a fluid inflow orifice 61 and a fluid outlet orifice 62 and the bars 12 may have fluid throughflow orifices 63 (FIG. 6). Provided at the fluid inflow orifice 61 is a fluid flow connection 64 which is connected via a valve 66 with a fluid source 67. Provided at the fluid outlet orifice 62 is a fluid return connection 65 which—depending on the fluid used and on process control—leads into the open air, the environment or, where applicable, via a treatment unit, back to the fluid source 67. Consequently, a tempering fluid may be fed through the hollow spaces 15 of the punch mould half 3, in order for example to preheat the tool 1, to cool the mould cavity 13 or particle foam bodies contained therein, or quite generally to effect a desired temperature control.

Depending on the nature and arrangement of the trimming bodies 30, 50 used (cf. FIGS. 3, 5), the fluid throughflow orifices 63 may be located in the upper area of the hollow spaces 15 or in the lower area of the hollow spaces 15, so that throughflow of the tempering fluid is not impeded by the trimming bodies 30, 50. If the fluid throughflow orifices 63, as in the depicted embodiment, are located in both the upper area and the lower area of the hollow spaces 15, then different types of trimming bodies 30, 50 may be used alternatively. The fluid inflow and outflow orifices 61, 62 are preferably at the height of the fluid throughflow orifices 63 or, if the fluid throughflow orifices 63 are located in both the upper area and also the lower area of the hollow spaces 15, at a height lying between the heights of the fluid throughflow orifices 63. If a trimming body 30 of fixed geometry is so large that it extends into the area of the fluid throughflow orifices 63, then transverse bores may be provided in such a trimming body 30 at the height of the fluid throughflow orifices 63. If it should be possible to fill a trimming body 50 of a mouldable material above the height of the fluid throughflow orifices 63 into the hollow space, then it may be advantageous for the fluid inflow and outflow orifices 61, 62 and the fluid throughflow orifices 63 to be connected by small pipes or the like. Even if the fluid inflow and outflow orifices 61, 62 in the depicted embodiment are provided on opposite sides of the punch mould half 3 and depending on fluid conduction within the punch mould half 3, they may be arranged on the same side or on adjacent sides. To avoid the tempering fluid escaping from the opening 14 of the hollow spaces 15, a seal may be provided on the contact surface of the second capacitor plate 5, wherein the seal may be designed as a boundary seal on the side of the second mould half 3 or as a flat seal on the side of the second capacitor plate 5. Where applicable, the material pairing between the second mould half 3 and the second capacitor plate 5 in operation (i.e. under pressure) may also have an adequate sealing effect.

Preferably each of the mould halves 2, 3 is made of a single moulding. Alternatively the side wall 8 of the first mould half 2 may be attached to the base 7. As a further alternative, the base 7 of the first mould half 2 may be omitted if an adequate seal between the side wall 8 and the first capacitor plate 4 is ensured in operation (i.e. under pressure). This may be effected by a separately provided seal or by the material pairing between the first mould half 2 and the first capacitor plate 4.

According to the embodiment described above, the capacitor plates 4, 5 are not part of the tool 1. In a variant embodiment, one or both of the capacitor plates 4, 5 may be part of the tool 1. For example the base 7 of the die mould half 2 may have the first capacitor plate 4, or the first capacitor plate 4 may form the base 7 of the die mould half 2. The first capacitor plate 4 may for example be attached to the side wall 8 of the die mould half 2 (for example screwed, glued, cast on, etc.) or integrated in the base 7 of the die mould half 2 (for example cast-in, inserted in a pocket, etc.).

Even if the openings 14 leading into the hollow spaces 15 are provided on the upper edge of the punch mould half 3 in the depicted embodiments, the invention is not restricted to this configuration. Instead, in embodiment variants, the openings 14 may also be provided in a side wall 11 of the punch mould half 3, while the top of the punch mould half 3 is closed. In order to reach, from one side, areas of the punch mould half 3 lying further inwards, openings 14 may also be provided in the bars 12. In such an embodiment variant, the second capacitor plate 5 may be joined to the punch mould half 3 or combine with it to form a component. For example the second capacitor plate 5 may be attached to the side wall 11 of the punch mould half 3 (for example screwed, glued, cast on, etc.) or integrated in a top panel (where present) of the punch mould half 3 (for example cast-in, inserted in a pocket, etc.).

In further embodiment variants it is also conceivable that the side walls 8, 11 of the mould halves 2, 3 are made of an electrically conductive material, and that they are conductively connected to or made integral with the capacitor plates 4, 5. If the side walls 8, 11 of both mould halves 2, 3 are made electrically conductive, then they are coated, at least in the areas where they contact one another, with an electrically insulating layer, in particular a plastic coating. Preferably, in such an embodiment variant, the all-round side wall 8 is not electrically conductive, e.g. being made of plastic so that, at the boundary zone, no very small spaces occur which would lead to locally very strong electrical fields.

It should be noted that the presentation of the geometry of the mould halves 2, 3, the mould cavity 13 and the hollow spaces 15 is purely an example, and depends completely on the nature and shape of a particle foam body to be produced. If the mould cavity 13 and with it the punch mould half 3 in a top view are for example rectangular, the hollow spaces 15 may likewise be rectangular or square and arranged in the manner of a matrix of for example two rows of four hollow spaces 15 (FIG. 2A). As required, the hollow spaces 15 may be more or less close together, and the hollow spaces 15 may also have different cross-section shapes and sizes. For example the hollow spaces may also be hexagonal (FIG. 2B) in cross-section or circular (FIG. 2C) or more tightly packed (FIG. 2D) or have a different shape. If the mould cavity 13 and with it the punch mould half 3 in a top view are for example circular or oval, then the hollow spaces 15 may for example be arranged like a piece of cake (FIG. 2E) or surrounding a circular hollow space 15 in ring-segment form (FIG. 2F). The cross-section shapes of the mould half 3 shown in the Figures are entirely exemplary. The mould half 3 may be integral with the hollow spaces 15 and produced in a single operation, for example by a casting process. Alternatively, the hollow spaces 15 may also be incorporated subsequently in the mould half 3, for example by drilling out of a complete block. Moreover it is also possible to produce the mould halves 2, 3 by an additive production process such as three-dimensional printing, by which means complex shapes with great variety may be realised, with or without a minimum of reworking.

Even if, in the depicted embodiments, the hollow spaces 15 are provided in the punch mould half 3, the die mould half (first mould half) 2 may be provided with hollow spaces in a corresponding manner, in addition or as an alternative to the punch mould half 3.

In addition, in some depicted embodiments, the top capacitor plate 5 is provided with an all-round edge bar, which surrounds the side wall 11 of the punch mould half 3. This edge bar may help to centre and stabilise the side wall 11, but is entirely optional and may also be omitted.

Even when each of the side walls 8, 11 is described as a single continuous side wall, individual sections of the side walls 8, 11 adjacent to one another in the circumferential direction may also be referred to as side wall.

The tool 1 may be in the form of a crack gap tool, and used as such in operation in basically three different settings: an open setting (not shown) in which the two mould halves 2, 3 are completely separated from one another, so that a particle foam part produced with the moulding tool may be demoulded, an intermediate position (not shown) in which the punch mould half 3 is inserted so far into the die mould half 2 that the mould cavity 13 is closed, but the mould cavity 13 is not yet reduced to its final volume in the closed position (FIGS. 1, 3, 5, 6).

In the intermediate position, the filler hole 9 and any vent hole are not covered by the punch mould half 3, so that these through openings communicate with the mould cavity 13 and foam particles may be fed in and/or air discharged. In the intermediate position, the mould cavity 13 is filled with foam particles. The punch mould half 3 is then pressed a little further into the die mould half 2, so that the foam particles contained therein are compressed.

The tool 1 may be used in an apparatus 70 for the production of particle foam parts (FIG. 7). Such an apparatus has a supply tank 71 which is connected to the tool 1 by the filler hose 72. The tool 1 is mounted in a press 73 which has a press table 74, a press punch 75, a cylinder-piston unit 76 for moving the press punch 75, and a stable frame 77, to which the cylinder-piston unit 76 and the press table 74 are fixed. The press punch 75 is made of an electrically conductive metal plate. Varying from the embodiment of FIG. 1, in which the second capacitor plate 5 has a waveguide connection 6, here the press punch 75 is connected via a waveguide 78, e.g. in the form of a coaxial cable, to a wave generator 79. The press table 74 has an electrically conductive table top made of metal, which is connected to earth via an electrically conductive baseplate.

The use of the tool 1 to produce a particle foam part in the apparatus 70 is described below.

The tool 1 is, to begin with, in an intermediate position. Here the punch mould half 3 is inserted so far into the die mould half 2 that the mould cavity 13 is substantially closed. In this intermediate position the tool 1 is inserted in the press 73. The filler hose 72 is connected to the filler hole 9 of the tool 1.

Foam particles from the supply tank 71 are fed to the mould cavity 13. When the mould cavity 13 is completely filled with foam particles, then the cylinder-piston unit 76 is actuated, in order to press together the two clamping platens 13, 16 and with them the two mould halves 2, 3.

The tool 1 is thus brought into the closed position. By this means the foam particles present in the mould cavity 13 are compressed.

On pressing together of the two mould halves 2, 3, the filler hole 9 of the die mould half 2 is covered by the punch mould half 3 and thereby closed. The filler hose 72 may then be removed from the tool 1. A plug may then be inserted in the filler hole 9 and has a similar dielectric constant to the side wall 8.

In the pressed-together or closed state of the tool 1, the wave generator 79 is used to generate an electromagnetic high-frequency signal (RF or microwave signal) which is applied via the waveguide 78 to the press punch 75 at the top capacitor plate 5 of the punch mould half 3. The waveguide 78 may be hollow and may have a core. The bottom capacitor plate 4 of the die mould half 2 is connected to earth via the press table 74. The capacitor plates 4, 5 are insulated from one another electrically by the electrically non-conductive base body of the mould halves 2, 3, so that they form a plate capacitor, which encompasses the mould cavity 13. By means of the electromagnetic field thus generated, the foam particles are heated and welded together into a particle foam part.

The press 73 can be opened so that the tool 1 may be removed. If the tool has locking devices, it may be removed in the closed state. It may then be cooled by means of a suitable cooling device, for example a fan. While the tool 1 in which a particle foam part has already been formed is cooled, a further tool 1 may be inserted in the press 73.

When the particle foam part has been sufficiently cooled, the two mould halves 2, 3 are if necessary loosened, the punch mould half 3 is lifted, and the particle foam part may be suitably demoulded.

The capacitor plates 4, 5 are in this embodiment part of the apparatus 70 and may be used for a variety of tools 1. They are also used in particular as press plates in the apparatus 70. In this connection it is also irrelevant whether the tool 1 is inserted between the capacitor plates 4, 5 in the orientation shown in FIG. 1, etc. from above and below or vice-versa.

The tool according to the invention may be modified in a variety of ways. In a tool 1 according to a further embodiment, both mould halves 2, 3 are made with hollow spaces 15 for trimming the respective mould halves, in order to influence an electromagnetic field within the mould cavity 13 (FIG. 12). In this embodiment the first mould half 2 in this respect is basically analogous in form to the second mould half 3, so that the bars 12 and side wall 8 of the first mould half 2 form supports for the first capacitor plate 4.

Also in this embodiment the bars 12 are not integral with the mould halves 2, 3 as in previous embodiments, but are inserted as independent components in suitable slots in the side of the boundary walls 10 facing the mould cavity 13. Where applicable, corresponding slots, running vertically, may also be provided in the inner faces of the side walls 8, 11 of the mould halves 2, 3, in order to stabilise the bars 12. Alternatively or in addition, the bars 12 may also be bonded or welded on, or wedged between the side walls 8, 11.

The invention is also not restricted to the crack gap process. In the case of the tool 1 of this embodiment, the mould halves 2, 3 are not designed as punch and die, but instead abut one another at the ends with their side walls 8, 11. For this purpose the side walls 8, 11 have matching steps 120, in order to seal the mould cavity 13 as process pressure builds up. The tool 1 of this embodiment also has a filler hole 121 which, with the tool 1 closed, remains open and to which may be connected a filling injector 122, by which the foam particles are fed into the mould cavity 13.

Apart from the above modifications, what has been said previously for all other embodiments and their variants and modifications applies analogously, as far as basically applicable. Also the above modifications, not only in their totality but also modifications taken individually of any other embodiment and its variants and modifications of other independent variants, as far as basically applicable.

The inventors of the present application have made simulations of the effect of the present invention. To begin with, a simplified model as considered with the aid of an equivalent image (FIG. 8). This involved the capacitor plates 4, 5 being connected to a voltage source 80, corresponding to a polarisation state of the wave generator 79. Thus the capacitor plates 4, 5 are oppositely charged. Between the capacitor plates 4, 5 are to be found several areas 81, 82, 83, each with different, where applicable also locally distributed, dielectric properties. For the simulation, at least three areas are required, of which a first area 81 corresponds to the mould cavity 13, a second area 82 corresponds to the boundary wall 10 and a third area 83 corresponds to a hollow space 15 of the tool 1. Under this specification, an electromagnetic field E forms between the capacitor plates 4, 5, with its strength depending on the relative permittivity of the areas 81, 82, 83. Using this model, field strength patterns of the electromagnetic field E between the capacitor plates 4, 5 may be calculated. Further areas may be defined as required or for further approximation to specific forms of the tool 1 and of a tool system with trimming bodies.

For example one model provides in section two side walls 8 of the first mould half 2 (FIG. 9), extending between the capacitor plates 4, 5. A base (reference number 7 in FIGS. 1, 3, 5, 6) is not provided in this model. In this model, the capacitor plates 4, 5 extend sideways over the side wall 8 of the first mould half 2. The first capacitor plate 4 is earthed, the second capacitor plate 5 is connected to a wave generator 79. Between the side walls 8, a boundary wall 10 of the second mould half 3 extends in an oblique straight line. From the boundary wall 10, side walls 11 and bars 12 (i.e. supports 11, 12 for the purposes of the invention) lead to the second capacitor plate 5, in order to allow hollow spaces 15 between them (in section six hollow spaces 15, without restricting the generality). Defined between the first capacitor plate 4, the side walls 8 of the first mould half 2 and the boundary wall 10 is a mould cavity 13, which in this model is wedge-shaped. The side walls 8, 11, boundary wall 10 and bars 12 are of roughly equal strength, have a relative permittivity or around $\varepsilon r=3.2$ and abut one another at an angle. The mould cavity 13 and the hollow spaces 15 are initially empty (i.e. filled with air, $\varepsilon r=1$).

This model was subjected to a simulation of field strength distribution (FIG. 10). This involved the generation, by means of the wave generator 79, of an electromagnetic field $\underline{E}$ between the capacitor plates 5, 6, which without disturbances has a field strength of $|\underline{E}|=1.5$ E5 V/m. In the Figure, contour lines are plotted in gradations of around 0.25 E5 V/m. Of course, the transitions of field strength are not stepped, but fluid. It is shown that field strength declines within the boundary wall 10 to around 0.75 E5 V/m, with the lowest field strength occurring at parts of the boundary wall 10 which bound the hollow spaces 15, while the field strength in parts of the boundary wall 10 which border supports 11, 12 is somewhat higher. Within the supports 11, 12, as also the side wall 8 of the first mould half 2, apart from the points at which they abut the boundary wall 10, the field weakening is negligible. Within the mould cavity 13, at the points lying opposite the supports 11, 12, a locally tightly restricted increase in field strength occurs, similarly at the base of the hollow spaces 15. However this effect is extremely slight. This is associated with the fact that the field weakening within the supports 11, 12 is, as stated above, negligible.

The practically disappearing field weakening in the supports 11, 12 is at first surprising. On account of the dielectric properties, a field weakening of the order of magnitude of the boundary wall 10 would be expected. Such a field weakening in the supports 11, 12 would also lead to a marked lack of homogeneity of the field in the mould cavity 13 as compared with the supports 11, 12, and would be difficult to handle. The inventors of the present invention have however established, through theoretical considerations, simulations and tests, that such an effect is not present, which makes execution of the invention still practicable. A theoretical explanation for this behaviour is possible if one divides the arrangement between the capacitor plates 4, 5 into small elements in the lateral direction, and then considers the elements, first of all individually, and then superimposed. If one such element contains a support 11, 12 of a dielectric material, a field weakening would actually occur there. This is however superimposed and extinguished by a field strengthening which occurs in the boundary zone of an adjacent element (i.e. extending to the side over the adjacent element).

On the basis of the same model, a further simulation was conducted, in which the hollow spaces 15 were filled completely with a dielectric having relative permittivity of around $\varepsilon r=3.2$, and the mould cavity 13 was completely filled with a dielectric with a relative permittivity of around $\varepsilon r=1.3$ (FIG. 11). It revealed a marked weakening of the field in the whole area of the second mould half 3 (more precisely, in the left-hand higher area a lower weakening to around 1 to 1.25 E5 V/m, and in the right-hand less high area the greatest weakening, to around 0.75 E5 V/m) and a distinct strengthening of the field in the whole area of the mould cavity 13 (more precisely, in the left-hand less high area the greatest strengthening to over 2.5 E5 V/m, and in the right-hand higher side a lesser strengthening to around 1.75 to 2 E5 V/m).

It has been shown above, that in a tool for the production of particle foam parts by welding of foam particles using electromagnetic waves, a structure of a mould half of a dielectric material with a boundary wall 10 to the mould cavity 13 and supports 11, 12 which form hollow spaces 15 on the side facing away from the mould cavity, make it possible to produce in the mould cavity 13 an electromagnetic field with good homogeneity. Through the optional, targeted and selective introduction of trimming bodies 30, 50 into the hollow spaces 15, the mould half and thus the tool become capable of trimming in the sense that an electromagnetic field in the mould cavity 13 may be influenced in a targeted manner.

A development of the invention provides as further embodiment that the trimming of the mould half may be varied during a foaming process. The foaming process here covers a period from introduction of the foam particles to removal of the particle foam part. Naturally this does not rule out changes to trimming before and/or after the foaming process. For this purpose a trimming body in the form of a fluid is used and this fluid is fed via trimming fluid lines to the hollow space or spaces and/or carried away from the hollow space or spaces. The mould half and/or the associated capacitor plate is or are so designed that this may also occur during a foaming process, i.e. in particular with the tool mounted between the capacitor plates and/or with the mould cavity closed. Alternatively or additionally, the supply/removal of the trimming fluid may also be effected via a trimming fluid supply unit located between the mould half and the capacitor plate. For example water, oil or a viscous fluid (e.g. gel) may be used as trimming fluid. Preferably chosen as trimming fluid is a fluid with a low relative permittivity. In this embodiment it is possible to compensate for a change in relative permittivity due to escape of water (vapour) from the mould cavity 13 in the course of the foaming process through targeted introduction or removal of trimming fluid into or from the hollow spaces 15.

In one embodiment, bores 130 are provided in the side walls 11 and the bars 12, and connect the hollow spaces 15 in the second mould half 3 for communication purposes (FIG. 13). In the depicted variant, each of the bores 130 is made from one side through a side wall 11, continuously over the whole length or width of the mould half 3, through all bars 12 lying in one line, up to the last hollow space 15 lying on the line, and form in each case at least one opening 131 in a side wall 11. Attached at one of the openings 131 is a trimming fluid feed connection 132 with valve, which is connected to a trimming fluid supply tank 134 via a feed pump 133. Attached to another of the openings 131 is a trimming fluid discharge connection 135 with valve, which is connected to the trimming fluid feed pump 133 via a trimming fluid drain pump 136. Attached to another of the openings 131 is an incoming air connection 137 with valve, while a vent connection 138 with valve is attached to a last of the openings 131. The incoming air connection 137 and the venting connection may each be equipped with a fluid lock. The incoming air connection 137 may be connected to a compressed air tank or an air supply pump, and the venting connection 138 may be connected to a vacuum tank or a vacuum pump.

To fill the hollow spaces 15 with the trimming fluid, the trimming fluid feed connection 132 and the venting connection 138 are opened and the feed pump 133 is set in operation, in order to feed trimming fluid from the trimming fluid supply tank 134 into the hollow spaces 15. Due to the communicating connection via the bores 130, all hollow spaces 15 are reached. Surplus air can escape through the venting connection 138. When the hollow spaces 15 are filled with a predetermined amount of trimming fluid, the trimming fluid feed connection 132 and the venting connection 138 are closed and the feed pump 133 is switched off. The amount of trimming fluid may be determined in advance. Reaching of the predetermined amount may be determined for example by a flow measurement at the feed pump 133, or ensured by design of the latter as a metering pump. Alternatively, complete filling of the hollow spaces 15 may be detected by triggering a fluid lock of the venting connection 138.

To empty the hollow spaces 15, the trimming fluid discharge connection 135 and the incoming air connection 137 are opened, and the trimming fluid drain pump 136 is put into operation, in order to withdraw trimming fluid from the mould half 3 and return it to the trimming fluid supply tank 134. The trimming fluid may therefore also be moved in a circuit. Because of the communicating connection of the bores 130, all hollow spaces 15 are reached. The hollow spaces 15 may be kept unpressurised via the incoming air connection 137, or the removal of trimming fluid may be assisted by compressed air. When the hollow spaces 15 have been emptied, the trimming fluid discharge connection 135 and the incoming air connection 137 are closed and the trimming fluid drain pump 136 is switched off.

The trimming fluid feed connection 132 and/or the trimming fluid discharge connection 135 may each be designed optionally without a valve, if the respective pump 133, 136 has suitable locking devices. Optionally, the pumps 133, 136 may be integrated with the respective trimming fluid connections 132, 135, or attached to the latter, or the valves of the trimming fluid connections 132, 135 may be integrated with or attached to the respective pumps 133, 136.

In the depicted embodiment variant, each bore 130 ends in the last hollow space 15 lying on the bore line. Alternatively, the bores 130 may also pass via the last hollow space 15 through the adjacent side wall 11. This increases the connection options and in this way also facilitates adaptation to circumstances on the equipment side. Openings in the side walls 11 which are not required may be closed by blind plugs.

In one embodiment variant the bores 130 may be made on a first plane relative to a height of the mould half 3, and further bores (not explicitly shown) may be made on a second higher plane, wherein the trimming fluid connections 132, 135 are connected to the openings 131 on the first plane, and the incoming air connection 137 and the venting connection 138 are connected on the second plane. Openings in the side walls 11 which are not required are then closed by blind plugs.

Instead of bores, in production of the mould half 3, an additive production process may be used to provide apertures in the side walls 11 and the bars 12. At the same time, additional connections may also be made in the bars 12, without the need for a bore from the outside. This may also avoid the need for unnecessary openings in the side walls 11.

In a further embodiment, covers 140 are provided in each of the hollow spaces 15 of the top mould half 3, dividing each hollow space into a trimming chamber 142 below the cover 140 and a pressure chamber 141 above the cover 140 (FIG. 14). The covers 140 are pushed upwards by respective compression springs 148 mounted in the trimming chamber 142. Through respective bores in the covers 140 and in the capacitor plate 5 bordering the top mould half 3, trimming fluid lines 143 extend into the trimming chamber 142 of each hollow space 15. The trimming fluid lines 143 run together outside the tool and are connected to a trimming fluid valve 144, here in the form of a directional valve. Through the trimming fluid valve 144, in a first switching position, trimming fluid may be fed via a trimming fluid feed pump 133 from a trimming fluid supply tank 134 into the trimming fluid line 143. In a second switching position, the trimming fluid line 143 is connected to a return line in the trimming fluid supply tank 134. In a third switching position (neutral position), all connections of the trimming fluid valve 144 are blocked. Through further bores in the capacitor plate 5, compressed air lines 145 extend into the pressure chamber 141 of each hollow space 15. The compressed air lines 145 converge outside the tool and are connected to a compressed air valve 146, which is here in the form of a directional valve. In a first switching position (neutral position), the compressed air line 145 is connected to atmosphere. In a second switching position, the compressed air line 145 is connected to a compressed air tank 147.

To fill the hollow spaces 15 with trimming fluid, the trimming fluid valve 144 is switched from the neutral position into the first switching position, wherein the compressed air valve 146 in the first switching position is connected to atmosphere, and the feed pump 133 is set in operation to feed trimming fluid from the trimming fluid supply tank 134 through the trimming fluid lines 143 into the trimming chambers in the hollow spaces 15. Because of the individual connection via the trimming fluid lines 143 with the trimming fluid feed pump 133, all hollow spaces 15 are filled quickly and simultaneously with trimming fluid. Surplus air can escape via the compressed air valve 146 when the covers 140 in the hollow spaces 15 are pressed upwards. When the hollow spaces 15 are filled with a predetermined amount of trimming fluid, the trimming fluid valve 144 is switched into the neutral position, thereby blocking any flow of trimming fluid, and the feed pump 133 is switched off. Through the action of the compression spring 148, which presses the covers 140 upwards, the amount of trimming fluid may be equalised between the individual hollow spaces 15. Reaching of the predetermined amount may be determined for example by a flow measurement at the feed pump 133 or ensured by design of the latter as a metering pump.

To empty the hollow spaces 15, the trimming fluid valve 144 is switched into the second switching position, and the compressed air valve is switched into the second switching position in order to supply the pressure chambers 141 of the hollow spaces 15 with compressed air. The compressed air in the pressure chambers 141 presses the covers 140 down, so that the trimming fluid in the trimming chambers 142 is pressed into the trimming fluid lines 143 and out of the mould half 3, and is returned to the trimming fluid supply tank 134. Consequently the trimming fluid too may also be circulated. Due to the individual connection via the compressed air lines 145 with the compressed air tank 147, all hollow spaces 15 are emptied simultaneously and quickly. When this process has been completed, the trimming fluid valve 144 is switched into the neutral position and the compressed air valve 146 again connected to atmosphere.

In a modification (not shown in detail), the trimming fluid lines 143 may be connected individually to respective trimming fluid valves for each hollow space 15. The trimming fluid valves may be attached to the capacitor plate 5, or accommodated or combined in a separate control unit. Here the trimming fluid valves may be of the same design as the trimming fluid valve 144 and connected by the respective different routes with the trimming fluid feed pump 133 via a common trimming fluid feed line, or with the trimming fluid supply tank 134 via a common trimming fluid return line.

In a further modification (not shown in detail), the compressed air lines 145 may be connected individually to respective compressed air valves for each hollow space 15. The compressed air valves may be attached to the capacitor plate 5, or accommodated or combined in a separate control unit. Here the compressed air valves may be of the same design as the compressed air valve 146 and connected by the respective different routes with the compressed air tank 147 via a common compressed air line or, if applicable, connected to atmosphere via a common venting line.

In a further modification (not shown in detail), sections of the trimming fluid lines 143 and/or the compressed air lines 145 may be attached separately to an inside and/or an outside of the capacitor plate 5. At the same time the bores in the capacitor plate 5 may be provided for example with threads, so that an inner part of the trimming fluid lines 143 and/or the compressed air lines 145 may be screwed to the inside of the capacitor plate 5, and an outer part of the trimming fluid lines 143 and/or the compressed air lines 145 may be screwed to the outside of the capacitor plate 5. For example, an inner part of the trimming fluid lines 143 may be a pipe section with a threaded end. Moreover, an inner part of the trimming fluid lines 143 may be of varying length, depending on the depth of the hollow space 15 to be supplied.

In a development of the last-mentioned modification, a connection plate (not shown in detail) may be provided, carrying sections of the trimming fluid lines 143 and/or the compressed air lines 145 facing into the hollow spaces 15. The sections of the trimming fluid lines 143 may here for example be in the form of pipe sections, which are firmly joined to the connection plate or may be attached to it, for example using screws, insertion or bonding in suitable bores. The sections of the compressed air lines 145 may be designed in a similar manner and attached or be simple openings of corresponding bores, since the compressed air lines 145 need not extend into the hollow spaces 15. At the same time, bores in the capacitor plate 5 may line up with bores in the intermediate plate, so that sections of the trimming fluid lines 143 and/or the compressed air lines 145 which are attached to the connection plate, may be inserted from the outside, through the bores, into the capacitor plate 5, so that a reliable alignment of the connection plate and the capacitor plate is also ensured. The outer parts of the trimming fluid lines 143 and the compressed air lines 145 are then to be attached to the outside of the connection plate. The connection plate may be made for example of metal or plastic. The connection plate may be made conventionally by providing a plate and pipes, where applicable with suitable machining and assembly. Alternatively, the connection plate including any pipes of the lines 143, 145 may be made in one piece by an additive production process.

In one variant, the connection plate is/may be located between the mould half 3 and the capacitor plate 5. In this case too, bores in the capacitor plate 5 may be aligned with bores in the intermediate plate. Then, however, the outer-lying parts of the trimming fluid lines 143 and the compressed air lines 145 are to be attached to the outside of the capacitor plate 5. In addition, in this variant, short pipe sections may be located as sections of the compressed air lines 145 on the outside of the connection plate, and may be insertable into the corresponding bores of the capacitor plate so that in this case too, a reliable alignment of the connection plate and the capacitor plate is ensured. If the connection plate of this variant is made of metal, it may act as a functional part of the capacitor plate 5 in respect of the generation of the electromagnetic field. If the connection plate of this variant is made of plastic, it can contribute to the dielectric effect of mould half 3.

In a further modification, it is possible to provide a connection plate 150 (FIG. 15), which holds or has sections of the trimming fluid lines 143 and the compressed air lines 145, wherein the sections of the lines 143, 145 facing towards the mould half open in the surface of the connection plate 150 and the outwards-facing sections of the lines 143, 145 open at a side edge or several side edges of the connection plate 150. A switch unit with valves may also be provided there. Specifically, the connection plate 150 may have a cuboid shape with an inner surface 151, an outer surface 152 opposite the former, a first side face 153 which connects the inner surface 151 and the outer surface 152, a second side face 154 which adjoins the first side face 153, and other side faces which lie opposite the first side face 153 and second side face 154 respectively. The inner surface 151 has a first group of bores 155, each carrying a pipe section 156, and a second group of bores 157. The first side face 153 carries in a plane close to the outer surface 152 a group of third bores 158, each meeting on a row of the first group of bores 155. The second side face 154 carries in a plane close to the inner surface 151 a group of fourth bores 159, each meeting on a row of the second group of bores 157. The first group of bores 155 is offset diagonally relative to the second group of bores 157, and the third group of bores 158 is offset vertically relative to the fourth group of bores 159, so that the bores 155 of the first group communicate only with bores 158 of the third group and vice-versa, and the bores 157 of the second group communicate only with bores 159 of the fourth group and vice-versa. Thus the bores 155 of the first group with pipe sections 156 and the bores 158 of the third group respectively form sections of the trimming fluid line 143, and the bores 157 of the second group and the bores 159 of the fourth group respectively form sections of the compressed air line 145 (cf. FIG. 14), and the trimming fluid line 143 has no overlaps with the compressed air line 145.

The openings of the bores 158, 159 may be connected to one another by respective line sections or connection units. All bores 155, 157, 158, 159 are preferably in the form of blind holes. If they are in the form of through bores, one side of each should be closed by blind plugs.

Although not shown in detail, the bores 158 of the third group may be connected to one another by a first collective bore in the second side face 154 or the side face lying opposite the former, and the bores 159 of the fourth group may be connected to one another by a second collective bore in the first side face 153 or the side face lying opposite the former. The bores 158, 159 of the third and fourth groups may then be closed by blind plugs, and only the first collective bore need be connected to the trimming fluid valve 144 and the second collective bore to the compressed air valve 146.

It goes without saying that the specific arrangement of the bores 155, 157, 158, 159 in FIG. 15 is to be understood as purely exemplary. In particular, the bores 158, 159 of the third and fourth groups may also be made on a single side face 153 or 154, in that case even on a single plane, without the occurrence of overlaps between the trimming fluid line 143 and the compressed air line 145. The arrangement shown in FIG. 15 has however the advantage that the media trimming fluid and compressed air are separated from one another from the technical connection standpoint.

Otherwise, the explanations made in respect of the connection plate described earlier, with regard to layout, material and method of production may be transferred equally to the connection plate 150 described here.

In a further modification, a cover plate 160 may also be provided. This is arranged between the mould half 3 and the capacitor plate 5 and has several projections which extend into the hollow spaces 15 and limit their volume (FIG. 16). Analogous to the arrangement shown in FIG. 13, one or more bores 130 may be provided in the top mould half 3, forming in at least one side wall 11 a connection opening for trimming fluid and cutting through at least one of the bars 12, in order to connect several hollow spaces 15 of the mould half 3 with fluidic communication. The arrangement of the bores may be in principle as desired, so long as trimming fluid may be fed to and removed from, or directed through, all hollow spaces. The projections 161 are preferably so dimensioned that the volumes remaining in the hollow spaces 15 are substantially of equal height, but this too is optional and may be adapted to requirements. In variants, the projections 161 may be interchangeable elements of different height, which can be attached to the cover plate. The bore or bores 130 is or are so designed that they lie in the range of the volumes left by the projections 161, and in addition in such a way that all volumes remaining in the hollow spaces 15 may be filled with trimming fluid and as far as possible completely emptied afterwards. Thus for example in FIG. 16 an opening made through the bore 130 at the top of the right-hand side wall 11 may serve as a feed connection for trimming fluid, and an opening made through the bore 130 at the bottom of the left-hand side wall 11 may serve as a discharge connection for trimming fluid, so that gravity may be utilised in both supply and removal of the trimming fluid. The cover plate 160 may in principle be made by a casting process, by deep-drawing a plate, by milling out and/or drilling from a solid piece or by an additive process. In the case of an additive process (3D printing), no bores are necessary, but instead all connection openings may be made in one go with the additive formation of the cover plate 160.

In a further embodiment, covers 170 may be provided, each arranged in one of the hollow spaces 15 with vertical movement facility and individually height-adjustable via a tappet 171 and a lifting drive 172 attached to the top capacitor plate 5 (FIG. 17). The tappets 171 are mounted in bores 173 of the top capacitor plate. The tappets 171 may be in the form of threaded rods, screwed into bores 173 provided with inside thread, and may be turned by the lifting drive 172 in the form of a rotary drive via a driving slot (not shown in detail), so that by turning in the (threaded) bores 173 an adjustment in height may be effected. Other facilities for height adjustment are well-known in the technology and may be used alternatively, depending on requirements. As in FIG. 17, at least one bore 130 is provided to supply the hollow spaces 15 with trimming fluid; in this respect the explanations given above apply. Through the height-adjustment, the covers are able to delimit the volume of the hollow spaces 15 individually (FIG. 16). Thus, the relative permittivity of the mould halves may not only be matched locally, but may also be varied in the course of the foaming process. In addition, expelling of the trimming fluid through the bore 130 may also be assisted by closing of the cover.

Naturally, everything described above relating to the top mould half 3 is applicable correspondingly and analogously to the bottom mould half 2.

According to a further embodiment, one of the mould halves 2, 3 may also have a side opening or several side openings 14, into which a mould body 30 may be inserted and removed from the side (FIG. 18A, direction of movement 180). The mould body 30 may be comb-shaped with a base 181 and several cuboid prongs 182 (FIG. 18B). Alternatively, several individual cuboid mould bodies 30 may be used which, if applicable, may be moved into and out of the hollow spaces 15 under individual control. A tool system with such mould halves 2, 3 and mould bodies 30 is especially, but not only, suitable for the production of particle foam part with the aid of electromagnetic waves. In a development, several mould bodies 30 in the form of plates of the same shape as described above, but of lower height, may be provided; together they fill the hollow spaces 15 and may be moved into and out of the hollow spaces 15 under individual control (FIG. 18C).

Pumps 133, 136, connections 132, 135, 137, 138, valves 144, 146, tanks 134, 147, lines 143, 145 and other pipework may be, individually and in any arrangement and/or sub-combination, part of a trimming fluid supply system. A control unit for control of all process operations described including the activation of motors, pumps, valves, and the provision of suitable sensors to provide process and status data for the control unit as required, are a matter of course and need no further explanation.

The invention has been described completely above with the aid of embodiments. The invention is however defined only by the appended independent claims and is further developed by the dependent claims. To the extent that the embodiments contain individual features which go beyond the dependent claims, these are for illustration only, but are not intended to limit the invention, even if they may contain further inventive ideas. All features which are described in relation to an embodiment, a variant, alternative or option, are also to be related to all other embodiments, variants, alternatives or options, unless clearly excluded. In addition, all features which are described in relation to an embodiment, a variant, alternative or option, also individually or in any desired sub-combination with one another and/or with features of other embodiments, variants, alternatives or options, define in each case independent subjects of the invention.

LIST OF REFERENCE NUMBERS

1 tool
2 first (bottom) mould half (die mould half)
3 second (top) mould half (punch mould half)
4 first capacitor plate (bottom capacitor plate)
5 second capacitor plate (top capacitor plate)
6 waveguide connection
7 base
8 side wall
9 filler hole
10 boundary wall
11 side walls (support)
12 bar (support)
13 mould cavity
14 opening
15 hollow space
30 trimming body
41 step
42 rim
42 latching arrangement
50 trimming body
61 fluid inflow orifice
62 fluid outlet orifice
63 fluid throughflow orifice
64 fluid flow connection
65 fluid return connection
66 valve
67 fluid source
70 apparatus
71 supply tank
72 filler hose
73 press
74 press table
75 press punch
76 cylinder-piston unit
77 frame
78 waveguide
79 wave generator
80 voltage source
81-83 areas
130 bore
131 opening
132 trimming fluid feed connection (valve)
133 trimming fluid feed pump
134 trimming fluid supply tank
135 trimming fluid discharge connection (valve)
136 trimming fluid drain pump
137 incoming air connection (valve)
138 venting connection (valve)
140 cover
141 pressure chamber
142 trimming chamber
143 trimming fluid line
144 trimming fluid valve
145 compressed air line
146 compressed air valve
147 compressed air tank
148 compression spring
150 connection plate
151 inner surface (to tool)
152 outer surface (to capacitor plate)
153, 154 side faces
155 bore (first group)
156 pipe section
157 bore (second group)
158 bore (third group)
159 bore (fourth (group)
160 cover plate
161 projection
170 cover
171 tappet
172 lifting drive
173 bore The above list is an integral part of the description.

The invention claimed is:

1. Tool for production of particle foam parts through welding of foam particles by means of electromagnetic waves, comprising two mould halves which bound a mould cavity, wherein at least one of the two mould halves is made of a material which is transparent to electromagnetic waves and has a boundary wall which bounds the mould cavity and one or more supports serving to support the boundary wall on a capacitor plate on a side facing away from the mould cavity and forming one or more hollow spaces, wherein at least one mould half of the two mould halves is designed for trimming the at least one mould half by means of the one or more supports and/or the one or more hollow spaces, in order to influence an electromagnetic field in the mould cavity such that a resulting relative permittivity of the tool coincides well with a relative permittivity of the foam particles.

2. Tool for production of particle foam parts through welding of foam particles by means of electromagnetic waves, comprising two mould halves which bound a mould cavity, wherein at least one of the two mould halves is made of a material which is transparent to electromagnetic waves and has a boundary wall which bounds the mould cavity and one or more supports serving to support the boundary wall on a capacitor plate on a side facing away from the mould cavity and forming one or more hollow spaces, wherein at least one mould half of the two mould halves is designed for trimming the at least one mould half by means of the one or more hollow spaces, wherein at least one hollow space of the one or more hollow spaces has an opening, through which a trimming body may be inserted into the at least one hollow space.

3. The tool according to claim 2, wherein the opening of the at least one hallow face faces the side facing away from the mould cavity.

4. The tool according to claim 2, wherein the at least one hollow space has a shaped or latching element for positioning and/or fixing a trimming body in the at least one hollow space.

5. The tool according to claim 2, wherein each of the at least one mould half has at least one connection for a trimming fluid, in particular liquid or oily or viscous, which is connected to at least one of the one or several hollow spaces, wherein several hollow spaces are connected for fluidic communication with one another, or at least part-volumes of several hollow spaces are separated from one another with fluid-tightness.

6. The tool according to claim 5, wherein each of the at least one mould half has at least one connection for compressed air and/or vacuum, which is connected to at least one of the one or several hollow spaces, wherein the at least one connection for compressed air and/or vacuum is arranged on a higher plane than the at least one connection for trimming fluid.

7. The tool according to claim 2, wherein the one or more hollow spaces are connected through connection openings in the one or more supports, wherein the connection openings or a group of connection openings are preferably flush with at least one connection made in a side wall for tempering medium, trimming fluid, compressed air or vacuum.

8. A tool system for production of particle foam parts, wherein the tool system includes a tool according to claim 2, and at least one trimming body which is designed for insertion in at least one hollow space of the one or more hollow spaces, and/or has a trimming fluid provision device which is designed to supply the at least one mould half with trimming fluid.

9. The tool system according to claim 8, wherein the at least one trimming body is made of a material with a relative permittivity (εr) of at least 2.

10. The tool system according to claim 8, wherein the at least one trimming body is made from a solid body or is produced by pouring a setting material into one or more of the hollow spaces.

11. The tool system according to claim 8, wherein the trimming body is designed as a plug-in body for plugging into the hollow space or at least one of the hollow spaces.

12. The tool system according to claim 11, wherein the trimming body has a shaped element or a latching element for positioning and/or fixing in the hollow space or at least one of the hollow spaces, or may be fixed by frictional locking in the hollow space or at least one of the hollow spaces.

13. The tool system according to claim 8, wherein the trimming body is so designed that it fills only a partial area of the hollow space or one of the hollow spaces, wherein the partial area is preferably a partial area located away from the mould cavity.

14. The tool system according to claim 8, wherein it includes trimming bodies of differing size and/or of different materials which have differing relative permittivity (εr).

15. The tool system according to claim 8, wherein it has a connection plate which is to be arranged between a capacitor plate and one mould half of the tool, or on a side of a capacitor plate facing away from a mould half of the tool, and which has media connections and/or media passages and/or media openings for the supply and/or removal of media from or to the outside and to or from the one or more hollow spaces of the mould half, wherein the connection plate preferably has pipe sections which, when a connection plate is fitted as specified, extend into the one or more hollow spaces of the mould half.

* * * * *